United States Patent
Ebara et al.

(10) Patent No.: US 12,554,603 B2
(45) Date of Patent: Feb. 17, 2026

(54) COMPUTER SYSTEM AND OPERATION MANAGEMENT METHOD FOR DISASTER-RECOVERY WHILE PRESERVING WRITE-ORDER CONSISTENCY

(71) Applicant: Hitachi, Ltd., Tokyo (JP)

(72) Inventors: Hiroto Ebara, Tokyo (JP); Yoshinori Ohira, Tokyo (JP); Takahiro Yamamoto, Tokyo (JP); Shintaro Ito, Tokyo (JP); Sachie Tajima, Tokyo (JP)

(73) Assignee: HITACHI VANTARA, LTD., Kanagawa-ken (JP)

( * ) Notice: Subject to any disclaimer, the term of this patent is extended or adjusted under 35 U.S.C. 154(b) by 64 days.

(21) Appl. No.: 18/597,494

(22) Filed: Mar. 6, 2024

(65) Prior Publication Data
US 2025/0110842 A1    Apr. 3, 2025

(30) Foreign Application Priority Data
Sep. 28, 2023 (JP) ................. 2023-168800

(51) Int. Cl.
*G06F 11/00* (2006.01)
*G06F 11/20* (2006.01)

(52) U.S. Cl.
CPC ........ *G06F 11/2069* (2013.01); *G06F 11/203* (2013.01); *G06F 11/2033* (2013.01); *G06F 11/2048* (2013.01); *G06F 11/2094* (2013.01)

(58) Field of Classification Search
CPC ............. G06F 11/2023; G06F 11/2033; G06F 11/2028; G06F 11/2035; G06F 11/2038; G06F 11/2041; G06F 11/2048; G06F 11/2069
See application file for complete search history.

(56) References Cited

U.S. PATENT DOCUMENTS

| | | | |
|---|---|---|---|
| 11,036,594 B1* | 6/2021 | Shats | G06F 11/1461 |
| 2008/0172572 A1* | 7/2008 | Beardsley | G06F 11/2082 714/E11.098 |
| 2018/0032254 A1 | 2/2018 | Okada et al. | |
| 2019/0370132 A1* | 12/2019 | Salapura | G06F 11/3037 |
| 2023/0109510 A1* | 4/2023 | Polimera | G06F 11/2094 714/6.3 |
| 2025/0117300 A1* | 4/2025 | Fitzpatrick | G06F 9/5072 |

* cited by examiner

*Primary Examiner* — Marc Duncan
(74) *Attorney, Agent, or Firm* — Volpe Koenig

(57) ABSTRACT

A computer system includes a primary site having a primary volume, and having an instance that performs data processing related to input/output data, and a secondary site having a secondary volume, and having an instance. Remote copy is set up between the primary and secondary volumes, and the instance of the primary site transfers data input to or outputted from the primary volume to the secondary site, while the instance of the secondary site stores the transferred data in the secondary volume. The computer system further includes a specifications changing section that changes specifications of the instance of the secondary site when a failover switching process of switching a performer of the data processing from the primary to secondary site is performed, or when a failback switching process of switching the performer of the data processing from the secondary to primary site after the failover switching process is performed.

17 Claims, 15 Drawing Sheets

FIG. 6A

SITE MANAGEMENT TABLE

| SITE TYPE | SITE STATE | DISASTER RECOVERY STATE | ADDRESSES | INSTANCE TYPE |
|---|---|---|---|---|
| PRIMARY | DOWN | DURING FAILOVER | 172.12.16.200<br>172.12.16.201 | - |
| SECONDARY | NORMAL | DURING FAILOVER | 172.12.16.202<br>172.12.16.203 | 2 |

FIG. 6B

INSTANCE SPECIFICATIONS INFORMATION MANAGEMENT TABLE

| TYPE | COST | CPU | MEMORY | NETWORK BANDWIDTH |
|---|---|---|---|---|
| 1 | 1$/h | USING 3GHZ, 16 CORES | 128GiB | 10Gbps |
| 2 | 2$/h | USING 3GHZ, 32 CORES | 256GiB | 20Gbps |
| 3 | 4$/h | USING 3GHZ, 64 CORES | 512GiB | 50Gbps |

FIG. 6C

SITE PERFORMANCE INFORMATION MANAGEMENT TABLE

| SITE TYPE | STATE | MAXIMUM CPU USAGE | MAXIMUM MEMORY UTILIZATION | MAXIMUM NETWORK BANDWIDTH UTILIZATION |
|---|---|---|---|---|
| PRIMARY | STEADY | USING 3GHZ, 24 CORES | 128GiB | 10Gbps |
| SECONDARY | STEADY | USING 3GHZ, 6 CORES | 32GiB | 2Gbps |
| ... | ... | ... | ... | ... |

COMPUTER SYSTEM AND OPERATION MANAGEMENT METHOD FOR DISASTER-RECOVERY WHILE PRESERVING WRITE-ORDER CONSISTENCY

BACKGROUND OF THE INVENTION

1. Field of the Invention

The present invention relates to a computer system and an operation management method, and is suitably applicable to, for example, a computer system that involves a method for reducing a cost of a secondary site by reducing hardware usage therein when the secondary site is on standby.

2. Description of the Related Art

A remote copy function is known as a technique of performing replication of data of a storage system between a plurality of data centers that are geographically remote from each other for business continuity even in case of a disaster. A storage system equipped with such a remote copy function includes a plurality of nodes. In this storage system, a site in which a business application is handled at a normal time is called a "primary site," while a site that is caused to take over an operation of the primary site when a failure affecting the entire primary site has occurred, stopping the storage system, is called a "secondary site."

US 2018/0032254, for example, describes a computer system in which a secondary site includes a plurality of storage apparatuses, and the storage apparatuses in the secondary site are selected so as to meet performance and capacity requirements of a primary site when remote copy pairs are formed between the primary site and the secondary site.

In the computer system described in US 2018/0032254, to prevent the performance of I/O processing from being reduced after a failover switching process of making a switch from the primary site to the secondary site is performed, the secondary site is provided with sufficient hardware to handle I/O processing that is to be performed after a remote copy process and the failover switching process are performed.

However, at a steady time, the secondary site needs to perform only the remote copy process, and therefore, the performance of the hardware thereof is excessive for the steady time, involving an increase in cost of introduction of the secondary site. Moreover, in a case where hardware provided by, for example, a cloud vendor on a pay-as-you-go basis is used in the secondary site, the performance of the hardware is excessive for the steady time, leading to a corresponding increase in operational cost.

The present invention has been conceived of in view of the above circumstances to propose a computer system and an operation management method that are able to achieve a reduction in cost involved in hardware of a secondary site at a steady time while maintaining the performance of I/O processing in a disaster recovery process.

SUMMARY OF THE INVENTION

According to an embodiment of the present invention, there is provided a computer system including a primary site having a primary volume, and having an instance that performs data processing related to input/output data, a secondary site having a secondary volume, and having an instance, and a specifications changing section, in which remote copy is set up between the primary volume and the secondary volume, and the instance of the primary site transfers data inputted to or outputted from the primary volume to the secondary site, while the instance of the secondary site stores the transferred data in the secondary volume, and the specifications changing section changes specifications of the instance of the secondary site when a failover switching process of switching a performer of the data processing from the primary site to the secondary site is performed, or when a failback switching process of switching the performer of the data processing from the secondary site to the primary site after the failover switching process is performed.

According to an embodiment of the present invention, there is provided an operation management method to be employed in a computer system including a primary site having a primary volume, and having an instance that performs data processing related to input/output data, and a secondary site having a secondary volume, and having an instance, in which remote copy is set up between the primary volume and the secondary volume, and the instance of the primary site transfers data inputted to or outputted from the primary volume to the secondary site, while the instance of the secondary site stores the transferred data in the secondary volume, and specifications of the instance of the secondary site are changed when a failover switching process of switching a performer of the data processing from the primary site to the secondary site is performed, or when a failback switching process of switching the performer of the data processing from the secondary site to the primary site after the failover switching process is performed.

Embodiments of the present invention make it possible to limit a cost involved in hardware of the secondary site at a steady time while maintaining the performance of I/O processing in a disaster recovery process.

BRIEF DESCRIPTION OF THE DRAWINGS

FIG. 6A is a diagram illustrating an example structure of a site management table stored in the disaster recovery management system of the disaster recovery management site;

FIG. 6B is a diagram illustrating an example structure of an instance specifications information management table stored in the disaster recovery management system of the disaster recovery management site;

FIG. 6C is a diagram illustrating an example structure of a site performance information management table stored in the disaster recovery management system of the disaster recovery management site;

DESCRIPTION OF THE PREFERRED EMBODIMENT

Hereinafter, an embodiment of the present invention will be described in detail with reference to the accompanying drawings.

Figure 1:
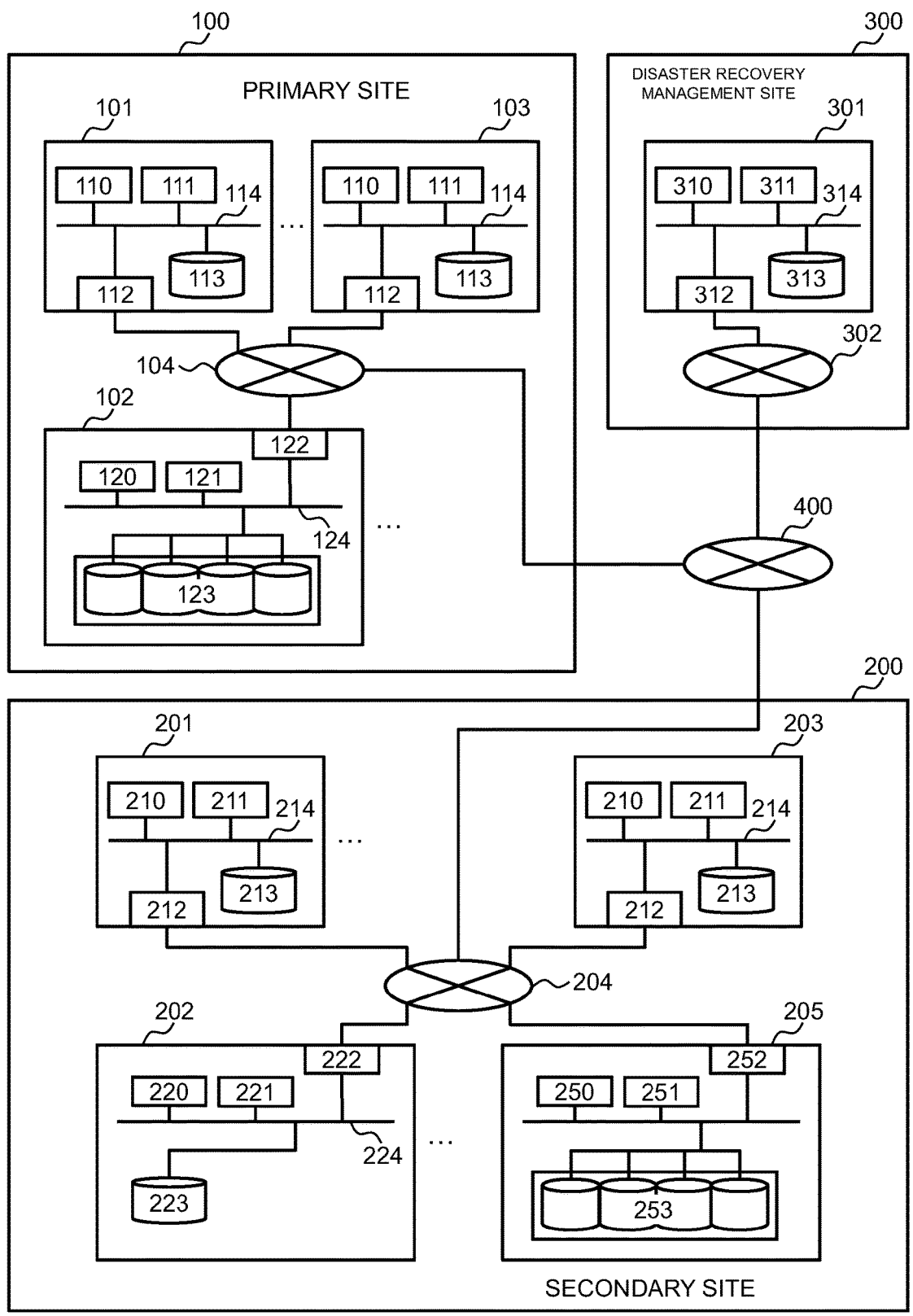
FIG. 1 is a system configuration diagram illustrating an example overall configuration of a computer system according to an embodiment of the present invention.

FIG. 1 is a system configuration diagram illustrating an example overall configuration of a computer system according to the present embodiment. The computer system includes a primary site 100, a secondary site 200, and a disaster recovery management site 300. The primary site 100, the secondary site 200, and the disaster recovery management site 300 are connected to one another through an external network 400.

The primary site 100 includes a host computer (hereinafter referred to simply as a "host") 101, a storage system 102, a site management system 103, and an internal network 104. The host 101, the storage system 102, and the site management system 103 are connected to one another through the internal network 104. Each of the host 101 and the storage system 102 of the primary site 100 is formed by one or more computers, while the site management system 103 is formed by a single computer. The host 101 and the site management system 103 of the primary site 100 may be formed by hardware virtualized by a virtualization support program (hypervisor) or the like. At the primary site 100, primary volumes, which will be described below, are managed in the storage system 102.

The host 101 has a processor 110, a memory 111, a port 112, and a storage device 113 installed therein. The processor 110, the memory 111, the port 112, and the storage device 113 are connected to one another through a bus 114. Two or more processors 110, memories 111, ports 112, and storage devices 113 may be installed in a single host 101, and may be used to implement a redundant configuration.

Each processor 110 has one or more execution modules (central processing unit (CPU) cores). The storage device 113 is a device capable of storing, for example, a program of an application that operates on the host 101. The storage device 113 is, for example, a device capable of making data persistent using a hard disk drive (HDD), a solid-state drive (SSD), or a non-volatile memory. The host 101 is connected to the internal network 104 of the primary site 100 through the port 112.

The storage system 102 has a processor 120, a memory 121, a port 122, and storage devices 123 installed therein, and these components are connected to one another through a bus 124. Two or more processors 120, memories 121, and ports 122 may be installed in a single storage system 102 and may be used to implement a redundant configuration. Each processor 120 has one or more execution modules (CPU cores). The memory 121 may include only a volatile memory or may include a volatile memory having a battery backup capability to provide protection against a power failure, or a non-volatile memory. The storage device 123 is a device capable of storing a program that operates on the storage device 123, user data, and on the like. The storage device 123 is, for example, a device capable of making data persistent using a HDD, an SSD, or a non-volatile memory. The storage system 102 is connected to the internal network 104 of the primary site 100 through the port 122.

The site management system 103 has a processor 110, a memory 111, a port 112, and a storage device 113 installed therein. The site management system 103 has a hardware configuration similar to that of the host 101. The site management system 103 is connected to the internal network 104 through the port 112.

The internal network 104 is connected to the external network 400 to establish network connection between each of the host 101, the storage system 102, and the site management system 103 and other sites. Here, the other sites refer to the secondary site 200 and the disaster recovery management site 300.

The secondary site 200 includes a host computer (hereinafter referred to simply as a "host") 201, a storage node 202, a site management system 203, an internal network 204, and a storage system 205. The host 201, the storage node 202, the site management system 203, and the storage system 205 are connected to one another through the internal network 204. At the secondary site 200, secondary volumes are managed in the storage node 202. The secondary volumes are paired with primary volumes in the primary site 100 through data synchronization via remote copy, so that identical pieces of data will be stored in the primary site 100 and the secondary site 200.

In the present embodiment, the storage node may be referred to simply as an "instance." Software operates on the instance. The instance is a virtual machine (virtual server), and it is therefore possible to easily change the specifications (i.e., instance specifications) of the instance. The specifications correspond to the amounts of computer resources allocated to the instance by the system, and higher specifications lead to increases in cost and power consumption. Note that the above-described storage node 202 has functions corresponding to those of the storage system 102 in the primary site 100 but is different from the storage system 102 in that the storage node 202 operates as a virtual machine (virtual server) as mentioned above while the storage system 102 is, for example, a physical storage system of an on-premises type.

Each of the host 201 and the storage node 202 of the secondary site 200 is formed by one or more computers. The storage node 202 includes three or more nodes, while the site management system 203 is formed by a single computer. The host 201 and the site management system 203 of the secondary site 200 may be formed by hardware virtualized by a virtualization support program (hypervisor) or the like.

The host 201 and the site management system 203 have structures similar to those of the host 101 and the site management system 103, respectively, of the primary site 100, and are each connected to the internal network 204 through a port 212.

The storage node 202 has a processor 220, a memory 221, a port 222, and a storage device 223 installed therein. The processor 220, the memory 221, the port 222, and the storage device 223 are connected to one another through a bus 224. The storage device 223 is a device capable of storing, for example, a program of an application that operates on the host 201. The storage device 223 is, for example, a device capable of making data persistent using a HDD, a SSD, or a non-volatile memory. The host 201 is connected to the internal network 204 through the port 212. The storage node 202 is, for example, formed by hardware virtualized by a virtualization support program (hypervisor) or the like, provided by a cloud vendor, and allows hardware specifications thereof to be changed at least while power of the storage node 202 is off. This virtualized hardware is, for example, hardware provided by the cloud vendor on a pay-as-you-go basis.

The storage system 205 has a processor 250, a memory 251, a port 252, and a storage device 253 installed therein, similarly to the storage system 102 of the primary site 100 and is a system that provides virtual external volumes provided by the cloud vendor. The storage system 205 is connected to the internal network 204 of the secondary site 200 through the port 252.

The internal network 204 is connected to the external network 400 to establish network connection with other sites. Here, the other sites refer to the primary site 100 and the disaster recovery management site 300.

The disaster recovery management site 300 includes a disaster recovery management system 301 and an internal network 302. In terms of hardware configuration, the disaster recovery management system 301 has a processor 310, a memory 311, a port 312, and a storage device 313 installed therein, similarly to each of the hosts 101 and 201 and the site management systems 103 and 203 of the primary site 100 and the secondary site 200. The disaster recovery management system 301 is connected to the internal network 302 through the port 312. The disaster recovery management system 301 is located at a site different from each of the primary site 100 and the secondary site 200 in the present embodiment, but in a case where the secondary site 200 is implemented by a virtualization system provided by the cloud vendor, for example, the disaster recovery management system 301 may be included in the secondary site 200. The internal network 302 is connected to the external network 400 to establish network connection with other sites. Here, the other sites refer to the primary site 100 and the secondary site 200.

Each of the internal networks 104, 204, and 302 of the respective sites may be connected to the external network 400 either through a dedicated line or using a public line such as a wide area network (WAN). Each of the internal networks 104, 204, and 302 and the external network 400 realize data transfer between the sites using a network protocol such as Transmission Control Protocol (TCP)/Internet Protocol (IP).

Figure 2:
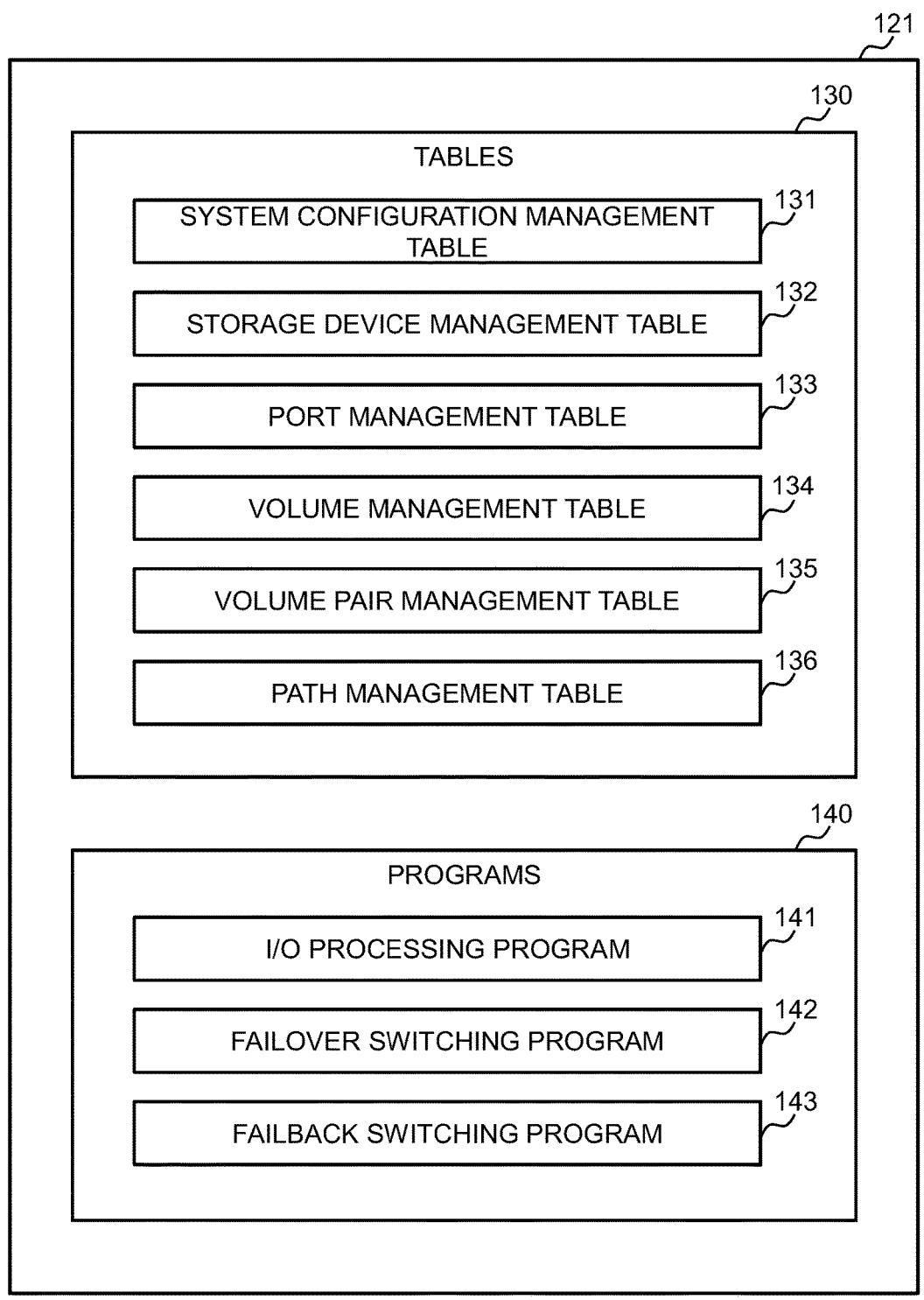
FIG. 2 is an overall configuration diagram illustrating lists of management tables and programs stored in a storage system and a storage node.

FIG. 2 is an overall configuration diagram illustrating lists of tables 130 and programs 140 stored in the storage system and the storage node according to the present embodiment. The tables 130 and the programs 140 are stored in each of the memory 121 of the storage system 102 and the memory 221 of the storage node 202. The tables 130 and the programs 140 are stored in a persistent state in the storage device 123 installed in the storage system 102 or the storage device 223 installed in the storage node 202 and are loaded into the memory 121 or 221 at startup.

The tables 130 include a system configuration management table 131, a storage device management table 132, a port management table 133, a volume management table 134, a volume pair management table 135, and a path management table 136. Details of these tables will be described below with reference to FIGS. 4A, 4B, 4C, 5A, 5B, and 5C.

The programs 140 include an I/O processing program 141, a failover switching program 142, and a failback switching program 143. The I/O processing program 141 performs, as examples of data processing related to input/output data, at least a data read process and a data write process accepted from the host 101 or 201, and sometimes performs storage functions such as compression/decompression, redundancy addition, and backup. Data processing performed by the I/O processing program 141 is performed in the primary site 100 before a failover, and functions thereof are taken over by the secondary site 200 after the failover and are thereafter returned to the primary site 100 after a failback and are performed therein. Before the failover and after the failback, the primary site 100 operates as a receiver of remote copy in relation to the secondary site 200. Meanwhile, after the failover and before the failback, the secondary site 200 performs the aforementioned data processing using data received via remote copy. Specific details of the processing will be described below with reference to FIGS. 9 and 10. The failover switching program 142 performs a failover switching process between the storage system 102 of the primary site 100 and the storage node 202 of the secondary site 200. Specific details of the process will be described below with reference to FIG. 12. The failback switching program 143 performs a failback switching process between the storage system 102 of the primary site 100 and the storage node 202 of the secondary site 200. Specific details of the process will be described below with reference to FIGS. 14 and 15.

Figure 3:
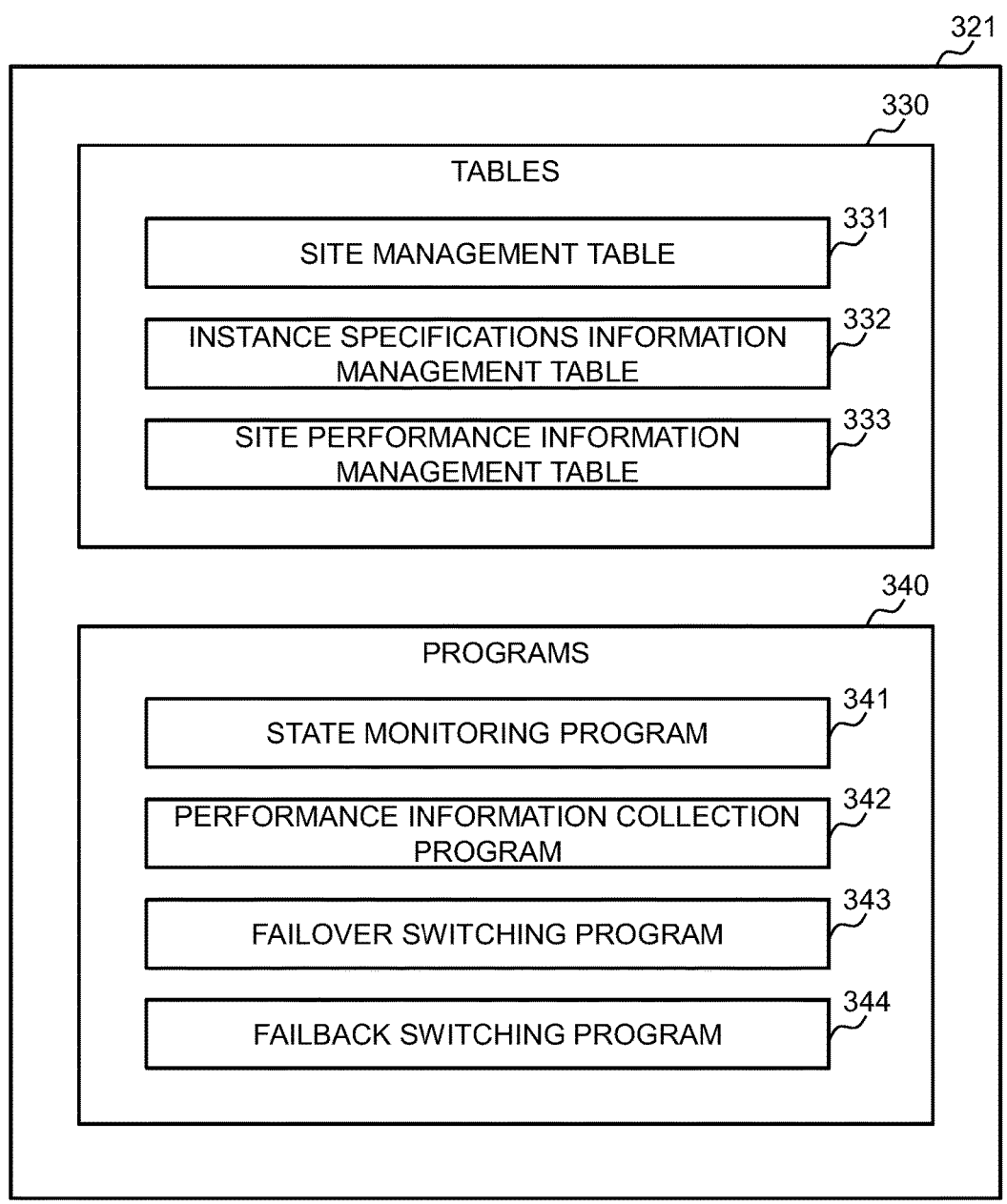
FIG. 3 is an overall configuration diagram illustrating lists of management tables and programs stored in a disaster recovery management system of a disaster recovery management site.

FIG. 3 is an overall configuration diagram illustrating lists of tables 330 and programs 340 stored in the disaster recovery management system 301 of the disaster recovery management site 300 according to the present embodiment. The tables 330 and the programs 340 are stored in a persistent state in the storage device 313 of the disaster recovery management site 300 and are loaded into the memory 311 at startup of the processor 310.

The tables 330 include a site management table 331, an instance specifications information management table 332, and a site performance information management table 333. Details of these tables will be described below with reference to FIGS. 6A, 6B, and 6C. The programs 340 include a state monitoring program 341, a performance information collection program 342, a failover switching program 343, and a failback switching program 344.

The state monitoring program 341 is a program to be started by the processor 310 to monitor the state of each of the primary site 100 and the secondary site 200. At this time, the state monitoring program 341 regularly communicates with the primary site 100 and the secondary site 200 to acquire the states of the respective sites and updates the site management table 331 on the basis of the acquired states of the respective sites.

The performance information collection program 342 is a program to be started by the processor 310 to collect performance information as to each of the primary site 100 and the secondary site 200. The performance information collection program 342 regularly communicates with the primary site 100 and the secondary site 200 to collect pieces of performance information as to the respective sites and updates the site performance information management table 333 on the basis of the collected pieces of performance information as to the respective sites.

The failover switching program 343 is a program to be started by the processor 310 to control the failover switching process between the primary site 100 and the secondary site 200. Specific details of the process will be described below with reference to FIG. 11.

The failback switching program 344 is a program to be started by the processor 310 to control the failback switching process between the primary site 100 and the secondary site 200. Specific details of the process will be described below with reference to FIG. 13.

Figure 4A:
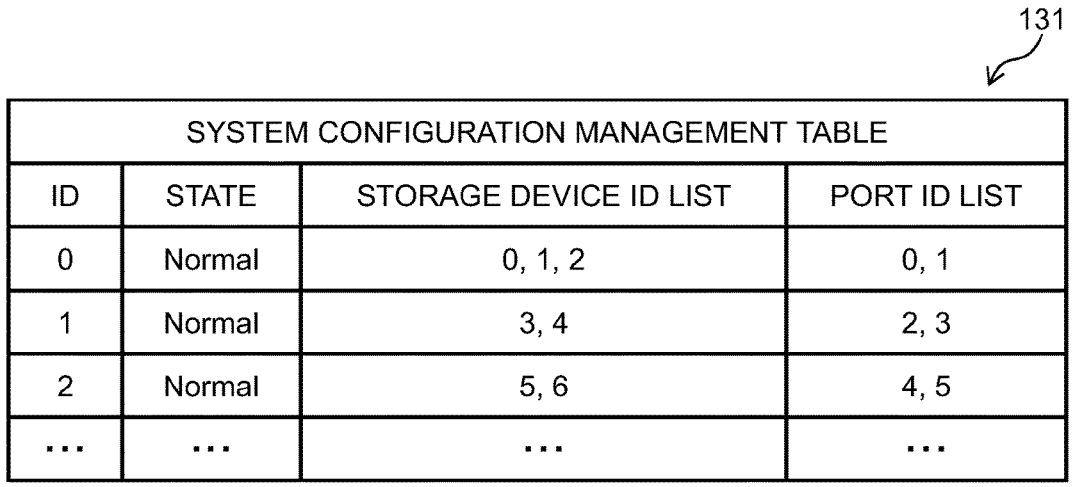
FIG. 4A is a diagram illustrating an example structure of a system configuration management table stored in each of a storage system of a primary site and a storage node of a secondary site.

FIG. 4A is a diagram illustrating an example structure of the system configuration management table 131 stored in each of the storage system 102 of the primary site 100 and the storage node 202 of the secondary site 200 according to the present embodiment.

The system configuration management table 131 is a table stored in each of the memory 121 of the storage system 102 and the memory 221 of the storage node 202. The system configuration management table 131 has entries for each of the storage system 102 and the storage node 202 existing in the computer system. Each entry includes the following items: an ID 131A, a state 131B, a storage device ID list 131C, and a port ID list 131D.

The ID 131A is a unique identifier in the computer system. In the ID 131A, "0" is stored, for example. The state 131B indicates the state of the corresponding storage system 102 or the corresponding storage node 202. In the state 131B, for example, "Normal" is stored in a case where the corresponding storage system 102 or the corresponding storage node 202 is in a normal state, while "Stopped" is stored in a case where the corresponding storage system 102 or the corresponding storage node 202 is in a stopped state due to site downtime or the like.

The storage device ID list 131C is a list of IDs of the storage device 123 or 223 managed by the storage system 102 or the storage node 202. In the storage device ID list 131C, "0, 1, 2," for example, is stored as a list of the IDs of the storage devices 123. The port ID list 131D is a list of IDs of the port 122 or 222 managed by the storage system 102 or the storage node 202. In the port ID list 131D, "0, 1," for example, is stored as a list of the IDs of the ports 122 managed by the storage system 102.

Figure 4B:
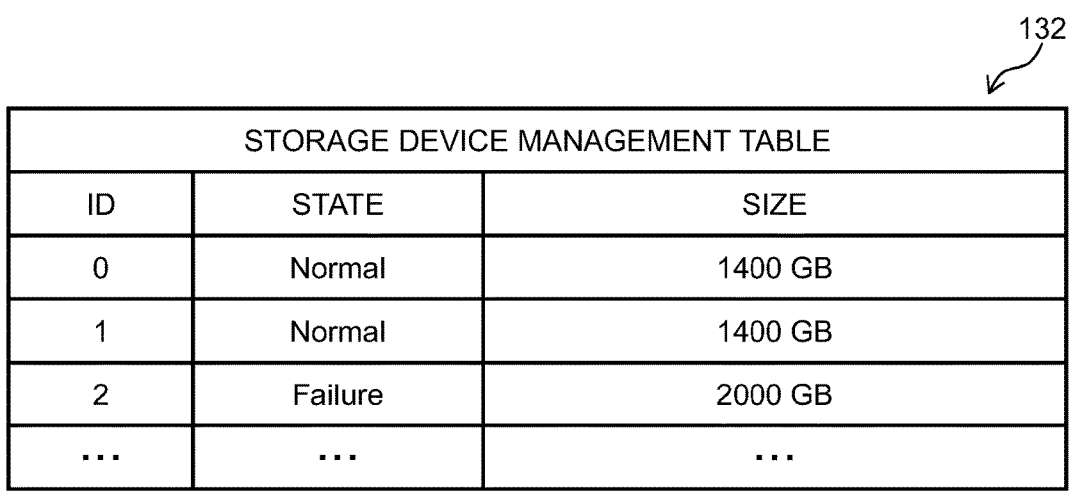
FIG. 4B is a diagram illustrating an example structure of a storage device management table stored in each of the storage system of the primary site and the storage node of the secondary site.

FIG. 4B is a diagram illustrating an example structure of the storage device management table 132 stored in each of the storage system 102 of the primary site 100 and the storage node 202 of the secondary site 200 according to the present embodiment.

The storage device management table 132 is a table stored in each of the memory 121 of the storage system 102 and the memory 221 of the storage node 202 and has entries for each of the storage system 102 and the storage node 202 existing in the computer system. Each entry includes the following items: an ID 132A, a state 132B, and a size 132C.

The ID 132A is a unique identifier in the computer system. In the ID 132A, "0" is stored, for example. The state 132B indicates the state of the corresponding storage device 123 of the corresponding storage system 102 or the corresponding storage device 223 of the corresponding storage node 202. In the state 132B, for example, "Normal" is stored in a case where the corresponding storage device 123 of the corresponding storage system 102 is normally accessible, while "Failure" is stored in a case where the corresponding storage device 123 of the corresponding storage system 102 is inaccessible. The size 132C indicates the capacity of the corresponding storage device 123 or the corresponding storage device 223. In the size 132C, "1400 GB" is stored as the capacity of the corresponding storage device 123, for example.

Figure 4C:
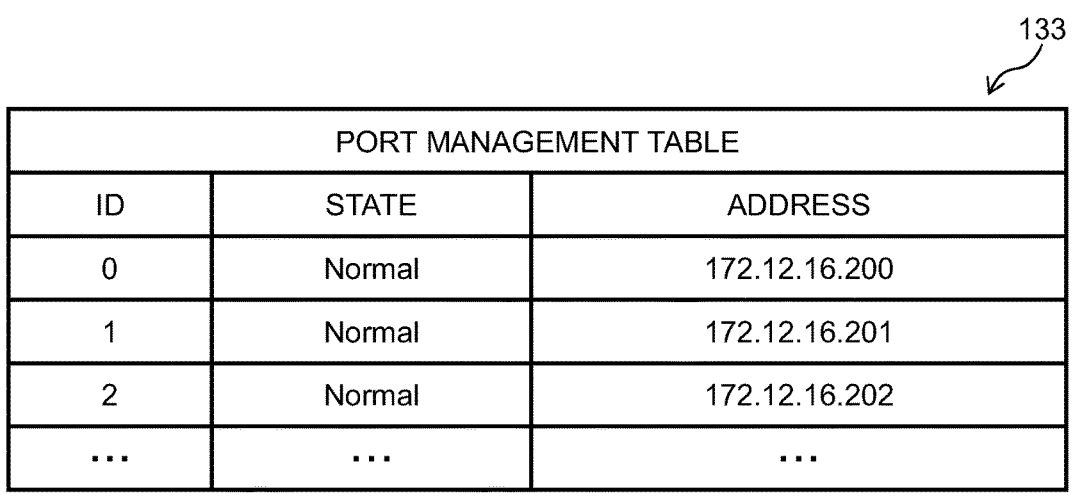
FIG. 4C is a diagram illustrating an example structure of a port management table stored in each of the storage system of the primary site and the storage node of the secondary site.

FIG. 4C is a diagram illustrating an example structure of the port management table 133 stored in each of the storage system 102 of the primary site 100 and the storage node 202 of the secondary site 200 according to the present embodiment. The port management table 133 is a table stored in each of the memory 121 of the storage system 102 and the memory 221 of the storage node 202 to manage the ports 122 of the storage system 102 and the ports 222 of the storage node 202. The port management table 133 has entries for each of the storage system 102 and the storage node 202 existing in the computer system. Each entry includes the following items: an ID 133A, a state 133B, and an address 133C.

The ID 133A is a unique identifier in the computer system. In the ID 133A, "0" is stored, for example. The state 133B indicates the state of the corresponding port 122 of the corresponding storage system 102 or the corresponding port 222 of the corresponding storage node 202. In the state 133B, for example, "Normal" is stored in a case where the corresponding port 122 of the corresponding storage system 102 is normally accessible, while "Failure" is stored in a case where the corresponding port 122 of the corresponding storage system 102 is inaccessible. The address 133C indicates an IP address assigned to the corresponding port 122 or 222. In the address 133C, "172.12.16.200" is stored as an address assigned to the corresponding port 122, for example.

Figure 5A:
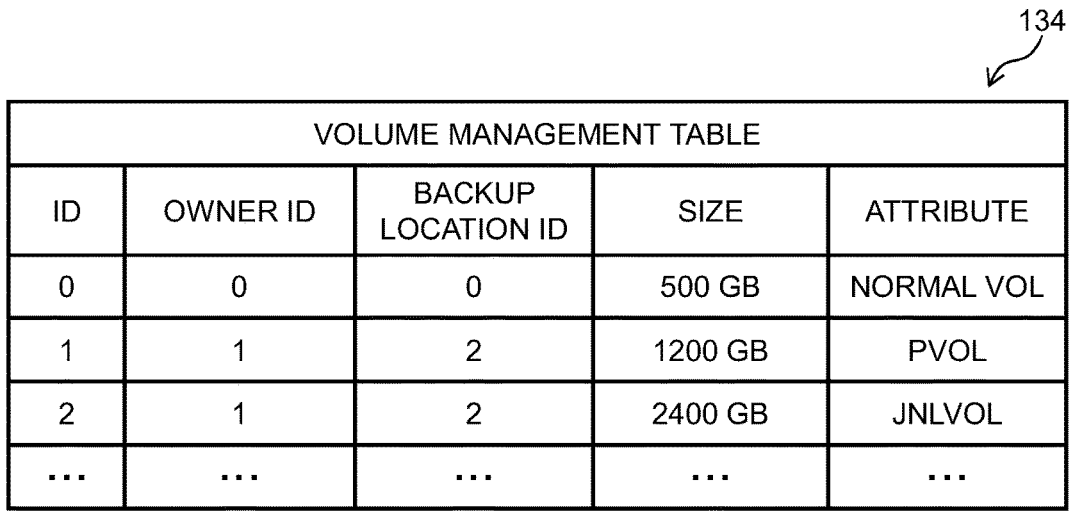
FIG. 5A is a diagram illustrating an example structure of a volume management table stored in each of the storage system of the primary site and the storage node of the secondary site.

FIG. 5A is a diagram illustrating an example structure of the volume management table 134 stored in each of the storage system 102 of the primary site 100 and the storage node 202 of the secondary site 200 according to the present embodiment.

The volume management table 134 is a table stored in each of the memory 121 of the storage system 102 and the memory 221 of the storage node 202. The volume management table 134 has entries for each of the storage system 102 and the storage node 202 existing in the computer system according to the present embodiment. Each entry includes the following items: an ID 134A, an owner ID 134B, a backup location ID 134C, a size 134D, and an attribute 134E. The owner ID 134B is, for example, an ID indicating an instance in charge.

The ID 134A is a unique identifier in the computer system according to the present embodiment. In the ID 134A, "0" is stored, for example. The owner ID 134B is an identifier of the storage system 102 or the storage node 202 in which the corresponding volume is located. In the owner ID 134B, for example, "0" is stored as the identifier of the storage system 102 in a case where the corresponding volume is located in the storage system 102.

The backup location ID 134C is an identifier of the location of a redundant volume paired with the corresponding volume. In a case where information in the owner ID 134B is "1," which represents the ID of the storage node 202, "2" is stored in the backup location ID 134C as the identifier of a storage node in which the redundant volume paired with the corresponding volume is located, for example. Note that, in a case where the information in the owner ID 134B is "0," which represents the ID of the storage system 102, the same information, "0," stored in the owner ID 134B is stored in the backup location ID 134C.

The size 134D indicates the capacity of the corresponding volume. In the size 134D, "500 GB," for example, is stored as the capacity of the corresponding volume. The attribute 134E indicates the attribute of the corresponding volume. For example, in a case where the corresponding volume does not form a pair, "Normal VOL" is stored in the attribute 134E; in a case where the corresponding volume is a primary volume of a pair, "PVOL" is stored in the attribute 134E; in a case where the corresponding volume is a secondary volume of a pair, "SVOL" is stored in the attribute 134E; and in a case where the corresponding volume is a journal volume, "JNLVOL" is stored in the attribute 134E.

Figure 5B:
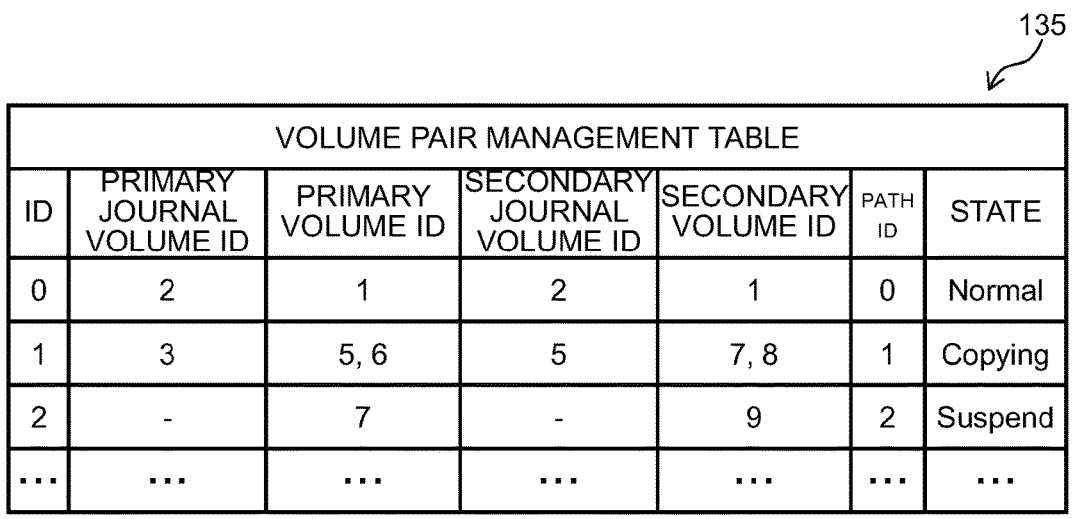
FIG. 5B is a diagram illustrating an example structure of a volume pair management table stored in each of the storage system of the primary site and the storage node of the secondary site.

FIG. 5B is a diagram illustrating an example structure of the volume pair management table 135 stored in each of the storage system 102 of the primary site 100 and the storage node 202 of the secondary site 200 according to the present embodiment.

The volume pair management table 135 is a table stored in each of the memory 121 of the storage system 102 and the memory 221 of the storage node 202 to manage pairs of volumes existing in the computer system. The volume pair management table 135 has entries for each of the storage system 102 and the storage node 202 existing in the computer system. Each entry includes the following items: an ID 135A, a primary journal volume ID 135B, a primary volume ID 135C, a secondary journal volume ID 135D, a secondary volume ID 135E, a path ID 135F, and a state 135G.

The ID 135A is a unique identifier in the computer system. In the ID 135A, "0" is stored, for example. The primary journal volume ID 135B is an identifier of a journal volume used by a primary volume of a corresponding volume pair. In the primary journal volume ID 135B, "2," for example, is stored as the identifier of the journal volume used by the primary volume of the corresponding volume pair.

The primary volume ID 135C is an identifier of the primary volume of the corresponding volume pair. In the primary volume ID 135C, "1," for example, is stored as an identifier of the primary volume of the corresponding volume pair. The secondary journal volume ID 135D is an identifier of a journal volume used by a secondary volume of the corresponding volume pair. In the secondary journal volume ID 135D, "2," for example, is stored as the identifier of the journal volume used by the secondary volume of the corresponding volume pair.

The secondary volume ID 135E is an identifier of the secondary volume of the corresponding volume pair. In the secondary volume ID 135E, "1," for example, is stored as the identifier of the secondary volume of the corresponding volume pair. The path ID 135F is an identifier of a communication path to be used in data transfer between the primary volume and the secondary volume of the corresponding volume pair. In the path ID 135F, "0," for example, is stored as the identifier of the communication path to be used in the data transfer between the primary volume and the secondary volume of the corresponding volume pair. The state 135G indicates the state of the corresponding volume pair. For example, in a case where the corresponding volume pair is in a normal state, "Normal" is stored in the state 135G; in a case where the corresponding volume pair is in a copying state, "Copying" is stored in the state 135G; and in a case where the corresponding volume pair is in a copy-suspend state, "Suspend" is stored in the state 135G.

Figure 5C:
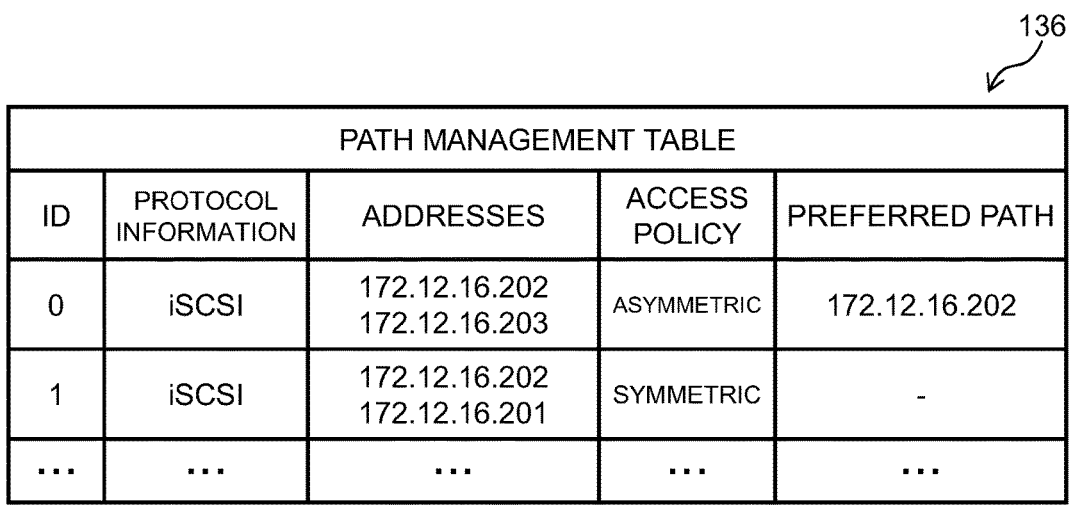
FIG. 5C is a diagram illustrating an example structure of a path management table stored in each of the storage system of the primary site and the storage node of the secondary site according to an embodiment of the present invention.

FIG. 5C is a diagram illustrating an example structure of the path management table 136 stored in each of the storage system 102 of the primary site 100 and the storage node 202 of the secondary site 200 according to the present embodiment.

The path management table 136 is a table stored in each of the memory 121 of the storage system 102 and the memory 221 of the storage node 202 to manage paths that exist in the computer system according to the present embodiment. The path management table 136 has entries for each of the storage system 102 and the storage node 202. Each entry includes the following items: an ID 136A, protocol information 136B, addresses 136C, an access policy 136D, and a preferred path 136E.

The ID 136A is a unique identifier in the computer system. In the ID 136A, "0" is stored, for example. The protocol information 136B is a data communication protocol to be used in the corresponding path. In the protocol information 136B, "iSCSI," for example, is stored as the data communication protocol used in the corresponding path. The addresses 136C are addresses of ports to which connection is to be made. The addresses 136C are basically two or more addresses, providing redundancy with use of a plurality of ports. In the addresses 136C, "172.12.16.202" and "172.12.16.203," for example, are stored as two addresses of ports to which connection is to be made.

The access policy 136D is a policy in use of ports when two or more ports are used. For example, in a case where the plurality of ports include a preferred path, "Asymmetric" is stored in the access policy 136D, whereas, in a case where the plurality of ports do not have different degrees of priority, and any of the ports may be selected for use, "Symmetric" is stored in the access policy 136D. Here, "Symmetric" indicates that the two ports (paths) are alternatively selected in a round robin fashion. Meanwhile, "Asymmetric" indicates that only one of the ports is used, and, when that port has become unavailable for use, the other port is used.

The preferred path 136E indicates an address of the port that has priority in a case where information in the access policy 136D is "Asymmetric." In the preferred path 136E, "172.12.16.202," for example, is stored as the address of the port that has priority in a case where the information in the access policy 136D is "Asymmetric." Note that, in a case where the information in the access policy 136D is "Symmetric," "-" is stored in the preferred path 136E as information that indicates no use.

FIG. 6A is a diagram illustrating an example structure of the site management table 331 stored in the disaster recovery management system 301 of the disaster recovery management site 300 according to the present embodiment. The site management table 331 is a table stored in the memory 311 of the disaster recovery management system 301 of the disaster recovery management site 300 to manage the primary site 100 and the secondary site 200. The site management table 331 has entries for each of the storage system 102 and the storage node 202 existing in the computer system. Each entry includes the following items: a site type 331A, a site state 331B, a disaster recovery state 331C, addresses 331D, and an instance type 331E.

The site type 331A is a type that indicates which of the primary site 100 and the secondary site 200 the corresponding site to be managed by the disaster recovery management site 300 is. In a case where the corresponding site to be managed by the disaster recovery management site 300 is the primary site 100, for example, "Primary" is stored in the site type 331A. The site state 331B indicates the state of the corresponding site to be managed by the disaster recovery management site 300. For example, in a case where the corresponding site to be managed by the disaster recovery management site 300 is the secondary site 200 and the secondary site 200 is normally operating, "Normal" is stored in the site state 331B, whereas, in a case where the corresponding site to be managed by the disaster recovery management site 300 is the primary site 100 and the primary site 100 is down due to a failure or the like, "Down" is stored in the site state 331B.

The disaster recovery state 331C indicates the state of disaster recovery of the corresponding site to be managed by the disaster recovery management site 300. For example, in a case where the corresponding site to be managed by the disaster recovery management site 300 is the primary site 100 and the primary site 100 is during failover, "During Failover" is stored in the disaster recovery state 331C. Note that specific states of the sites and transition to each of the states will be described below with reference to FIG. 8.

The addresses 331D are addresses of ports used to make access to the corresponding site to be managed by the disaster recovery management site 300. In the addresses 331D, for example, "172.12.16.200" and "172.12.16.201" are stored as the addresses of the ports 122 of the primary site 100 to be managed by the disaster recovery management site 300.

The instance type 331E is a type to be used in a case where "Secondary" is stored in the site type 331A and indicates a type in the instance specifications information management table 332 to be used in the secondary site 200. In the instance type 331E, "2," for example, is stored as a type in the instance specifications information management table 332. Note that in a case where "Primary" is stored in the site type 331A, the instance type is not used, and "-" is accordingly stored in the instance type 331E.

FIG. 6B is a diagram illustrating an example structure of the instance specifications information management table 332 stored in the disaster recovery management system 301 of the disaster recovery management site 300 according to the present embodiment. The instance specifications information management table 332 is a table stored in the memory 311 of the disaster recovery management system 301 of the disaster recovery management site 300 to manage operation specifications (hereinafter also referred to simply as "specifications" or "instance specifications") of instances that can be executed in the secondary site 200. The instance specifications information management table 332 has entries for each of the storage system 102 and the storage node 202 existing in the computer system. Each entry includes the following items: a type 332A, a cost 332B, a CPU 332C, a memory 332D, and a network bandwidth 332E.

The type 332A is an identifier for uniquely identifying one of a plurality of types of instance specifications. In a case of a second one (i.e., middle specifications) of three types of instance specifications (high specifications, middle specifications, and low specifications), for example, "2" is stored in the type 332A.

The cost 332B is a usage charge to be incurred for each type of instance specifications, and indicates, for example, a charge per hour. In the cost 332B, "2$/h" is stored as the usage charge to be incurred for the second type (i.e., the middle specifications) of instance specifications, for example. The CPU 332C indicates the frequency and the number of cores of a CPU that can be used with each type of instance specifications. In the CPU 332C, "3 Ghz, 32 cores" is stored as the frequency and the number of cores of a CPU that can be used with the second type (i.e., the middle specifications) of instance specifications, for example.

The memory 332D indicates the capacity (memory capacity) of a memory that can be used with each type of instance specifications. In the memory 332D, "256 GiB" is stored as the capacity of a memory that can be used with the second type (i.e., the middle specifications) of instance specifications, for example. The network bandwidth 332E is a network bandwidth that can be used with each type of instance specifications. In the network bandwidth 332E, "20 Gbps" is stored as the network bandwidth that can be used with the second type (i.e., the middle specifications) of instance specifications, for example.

FIG. 6C is a diagram illustrating an example structure of the site performance information management table 333 stored in the disaster recovery management system 301 of the disaster recovery management site 300 according to the present embodiment. Note that the site performance information management table 333 is a table that is periodically updated.

The site performance information management table 333 is a table stored in the memory 311 of the disaster recovery management system 301 in the disaster recovery management site 300 to manage the performance of the primary site 100 and the secondary site 200. The site performance information management table 333 has entries for each of the storage system 102 and the storage node 202. Each entry includes the following items: a site type 333A, a state 333B, a maximum CPU usage 333C, a maximum memory utilization 333D, and a maximum network bandwidth utilization 333E.

The site type 333A is a type that indicates which of the primary site 100 and the secondary site 200 the corresponding site to be managed by the disaster recovery management site 300 is. In a case where the corresponding site to be managed by the disaster recovery management site 300 is the primary site 100, for example, "Primary" is stored in the site type 333A. The state 333B indicates the disaster recovery state of the corresponding site to be managed by the disaster recovery management site 300, and different entries are prepared for different disaster recovery states. In a case where the disaster recovery state of the primary site 100 is a steady state, for example, "Steady" is stored in the state 333B thereof.

The maximum CPU usage 333C indicates the maximum usage of the CPU used in the storage system 102 of the primary site 100 or the storage node 202 of the secondary site 200 to be managed by the disaster recovery management site 300. In the maximum CPU usage 333C, "3 Ghz, 24 cores used" is stored as the maximum usage of the CPU in the storage system 102 of the primary site 100, for example.

The maximum memory utilization 333D indicates the maximum memory utilization of a memory used in the storage system 102 of the primary site 100 or the storage node 202 of the secondary site 200 to be managed by the disaster recovery management site 300. In the maximum memory utilization 333D, "128 GiB" is stored as the maximum memory utilization of the memory 121 of the storage system 102 of the primary site 100, for example.

The maximum network bandwidth utilization 333E indicates a maximum network bandwidth used in the storage system 102 of the primary site 100 or the storage node 202 of the secondary site 200 to be managed by the disaster recovery management site 300. In the maximum network bandwidth utilization 333E, "10 Gbps" is stored as the maximum network bandwidth utilization of the storage system 102 of the primary site 100, for example.

Here, the computer system according to the present embodiment includes the primary site 100 which has a primary volume and has an instance that performs data processing related to data inputted to or outputted from the primary site 100, and the secondary site 200 which has a secondary volume paired with the primary volume through data synchronization via remote copy and which has an instance. Remote copy is set up between the primary volume and the secondary volume, and the instance of the primary site 100 transfers data inputted to or outputted from the primary volume to the secondary site 200, while the instance of the secondary site 200 stores the transferred data in the secondary volume. The computer system has a specifications changing function (i.e., a specifications changing section) that changes the specifications (i.e., instance specifications) of the instance running on the secondary site when a failover switching process of switching a performer of the data processing from the primary site 100 to the secondary site 200 is performed, or when a failback switching process of switching the performer of the data processing from the secondary site 200 to the primary site 100 after the failover switching process is performed.

In the computer system according to the present embodiment, when a failure has occurred in the primary site 100 and the failover switching process is performed to make a switch from the primary site 100 to the secondary site 200, the specifications changing function raises the specifications of the instance that performs the data processing in the secondary site 200.

In the computer system according to the present embodiment, when the failover switching process has been performed, the instance of the secondary site 200 processes input/output data, and inputs or outputs the input/output data to or from the secondary volume.

In the computer system according to the present embodiment, when the failover switching process has been performed, the instance of the secondary site 200 performs data input/output using the secondary volume having data synchronized with that of the primary volume via the remote copy prior to the failover switching process.

In the computer system according to the present embodiment, the remote copy is stopped when the failover switching process has been performed.

In the computer system according to the present embodiment, when the primary site 100 has been recovered from the failure and the failback switching process is performed to switch the performer of the processing, switched from the primary site 100 to the secondary site 200 by the failover switching process, from the secondary site 200 to the primary site 100, the specifications of the instance of the secondary site 200 are lowered.

In the computer system according to the present embodiment, the specifications include an amount or amounts of hardware resources used by the instance.

In the computer system according to the present embodiment, the amount or amounts of hardware resources include a resource amount of at least one of an arithmetic processing device, a memory, and a network.

In the computer system according to the present embodiment, when the failover switching process or the failback switching process is performed, the secondary site 200 is stopped and restarted, and the specifications of the instance that performs the data processing are changed when the secondary site 200 is restarted.

More specifically, in the computer system according to the present embodiment, in each of the failover switching process and the failback switching process, the disaster recovery management system 301 selects the instance specifications that are capable of handling a load after a transition and which involves the lowest cost as the instance specifications of the secondary site 200 with reference to the site performance information management table 333 and the instance specifications information management table 332.

At the primary site 100, data processing related to data inputted to or outputted from the storage node is performed, and data is transferred to the secondary site 200 via remote copy, while at the secondary site 200, the storage node receives and stores the data. The data processing at the primary site 100 includes a heavy-load process, while at the secondary site 200, only storage of the data is performed, and the load is therefore light. For example, if a failure occurs in the primary site 100 when the middle type of instance specifications is adopted in the secondary site 200, a failover switching process is first performed to cause a transition from the primary site 100 to the secondary site 200, and the storage node in the secondary site 200 takes over the processing of the storage node in the primary site 100. At this time, the remote copy is stopped. Here, the middle type of instance specifications refers to, for example, the instance specifications that have the value of "2" in the type 332A of the instance specifications information management table 332.

At this time, for example, a fact that the maximum CPU usage 333C of the secondary site 200 has exceeded "32 cores" due to a peak load of the storage node 202 in the secondary site 200 is recorded in the site performance information management table 333. In a case where it is estimated that a CPU that has "32 or more and less than 64 cores" is required, for example, the disaster recovery management system 301 adopts the high type of instance specifications, which is instance specifications capable of handling the load after the transition, as the instance specifications in the secondary site 200. Here, the high type of instance specifications refers to, for example, the instance specifications that have the value of "3" in the type 332A of the instance specifications information management table 332. That is, as a result of the failover switching process being performed, the instance specifications are raised by one degree.

If the primary site 100 returns to a normal state after the failover switching process is completed, the failback switching process is performed to cause a transition from the secondary site 200 to the primary site 100, and the processing taken over by the storage node in the secondary site 200 as a result of the failover is returned to the instance of the primary site 100. In a case where, for example, a fact that the maximum CPU usage 333C of the secondary site 200 is equal to or less than "32 cores," the maximum memory utilization 333D thereof is equal to or less than "256 GiB," and the maximum network bandwidth utilization 333E thereof is equal to or less than "20 Gpbs" due to a peak load of the storage node 202 in the secondary site 200 has been recorded in the site performance information management table 333 at this time, the disaster recovery management system 301 adopts the middle type of instance specifications, which is instance specifications capable of handling the load after the transition, as the instance specifications in the secondary site 200. Here, the middle type of instance specifications refers to, for example, the instance specifications that have the value of "2" in the type 332A of the instance specifications information management table 332. That is, as a result of the failback switching process being performed, the instance specifications are lowered by one degree.

Note that, in a case where, for example, a fact that the maximum CPU usage 333C of the secondary site 200 is equal to or less than "3 Ghz, 16 cores," the maximum memory utilization 333D thereof is equal to or less than "128 GiB," and the maximum network bandwidth utilization 333E thereof is equal to or less than "10 Gpbs" due to a peak load of the storage node 202 has been recorded in the site performance information management table 333, the disaster recovery management system 301 can adopt the low type of instance specifications, which is instance specifications capable of handling the load after the transition, as the instance specifications in the secondary site 200. Here, the low type of instance specifications refers to, for example, the instance specifications that have the value of "1" in the type 332A of the instance specifications information management table 332.

Figure 7:
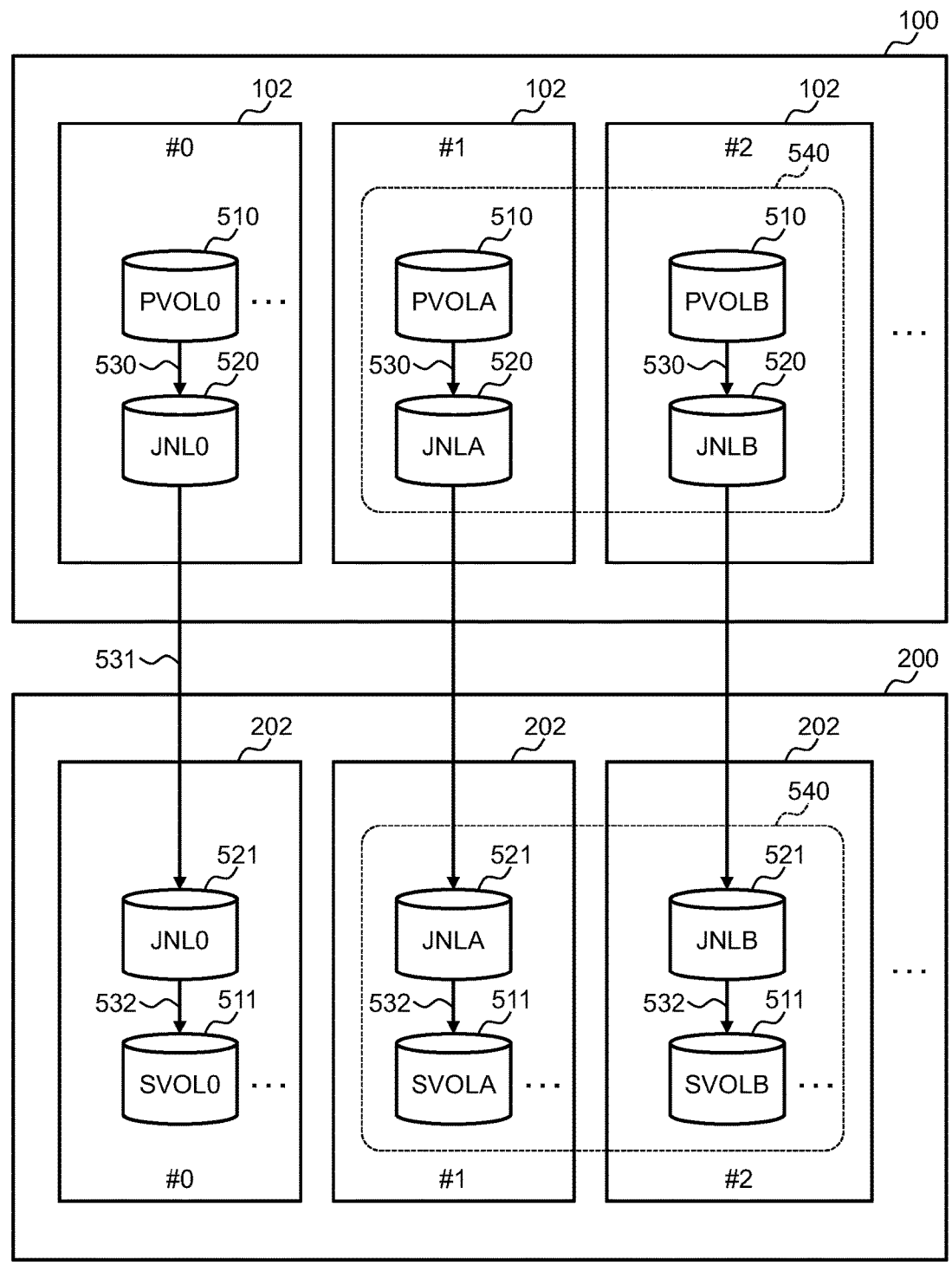
FIG. 7 is a diagram illustrating examples of a plurality of pairs of volumes formed between the primary site and the secondary site.

FIG. 7 is a diagram illustrating examples of a plurality of pairs of volumes formed between the primary site 100 and the secondary site 200. Note that a plurality of volumes are used as illustrated in the figure to allow primary volumes 510 in the primary site 100 to be copied to journal volumes 521 in the secondary site 200 simultaneously at a given check point.

The primary volumes (PVOL) 510 are placed in the storage systems 102 of the primary site 100. Secondary volumes (SVOL) 511, which are paired with the primary volumes 510 through data synchronization via the aforementioned remote copy, are placed in the storage nodes 202 of the secondary site 200.

At a steady time, the host 101 performs I/O processing on the primary volume 510 in the primary site 100. At this time, updating operation data 530 with respect to the primary volume 510 is recorded as updating operation data 531 in a journal volume (JNL0, JNLA, or JNLB) 520 on the storage system 102 in which the primary volume 510 is placed.

Thereafter, the updating operation data 531 recorded in the journal volume 520 of the primary volume 510 is transferred to the storage node 202 in the secondary site 200 via two iSCSI paths, for example, and is recorded as updating operation data 532 in a journal volume 521 placed in the storage node 202. Thereafter, the updating operation data 532 recorded in the journal volume 521 is incorporated into the secondary volume 511 paired with the primary volume 510 through data synchronization via the aforementioned remote copy as a result of an updating operation for the journal volume 521 in the secondary site 200. The journal volume 521 has information concerning a difference with data written to the primary volume 510 (PVOL).

A series of operations to be performed when the updating operation data recorded in the primary volume 510 in the primary site 100 is incorporated into the secondary volume 511 in the secondary site 200 may be performed either in an asynchronous manner or in a synchronous manner. In a case of the asynchronous manner, at a time when the recording into the journal volume 520 in the primary site 100 has been completed in the I/O processing of the host 101, a response regarding a result of the I/O processing is sent from the storage system 102 to the host 101, and thereafter, the integration of the updating operation data 532 into the secondary volume 511 in the secondary site 200 is performed. In a case of the synchronous manner, after the integration of the updating operation data 532 into the secondary volume 511 is completed in the I/O processing of the host 101, a response regarding a result of the I/O processing is sent from the storage system 102 to the host 101. Note that the computer system according to the present embodiment supports a consistency group of a plurality of primary volumes 510 and secondary volumes 511 bundled into a group.

Figure 8:
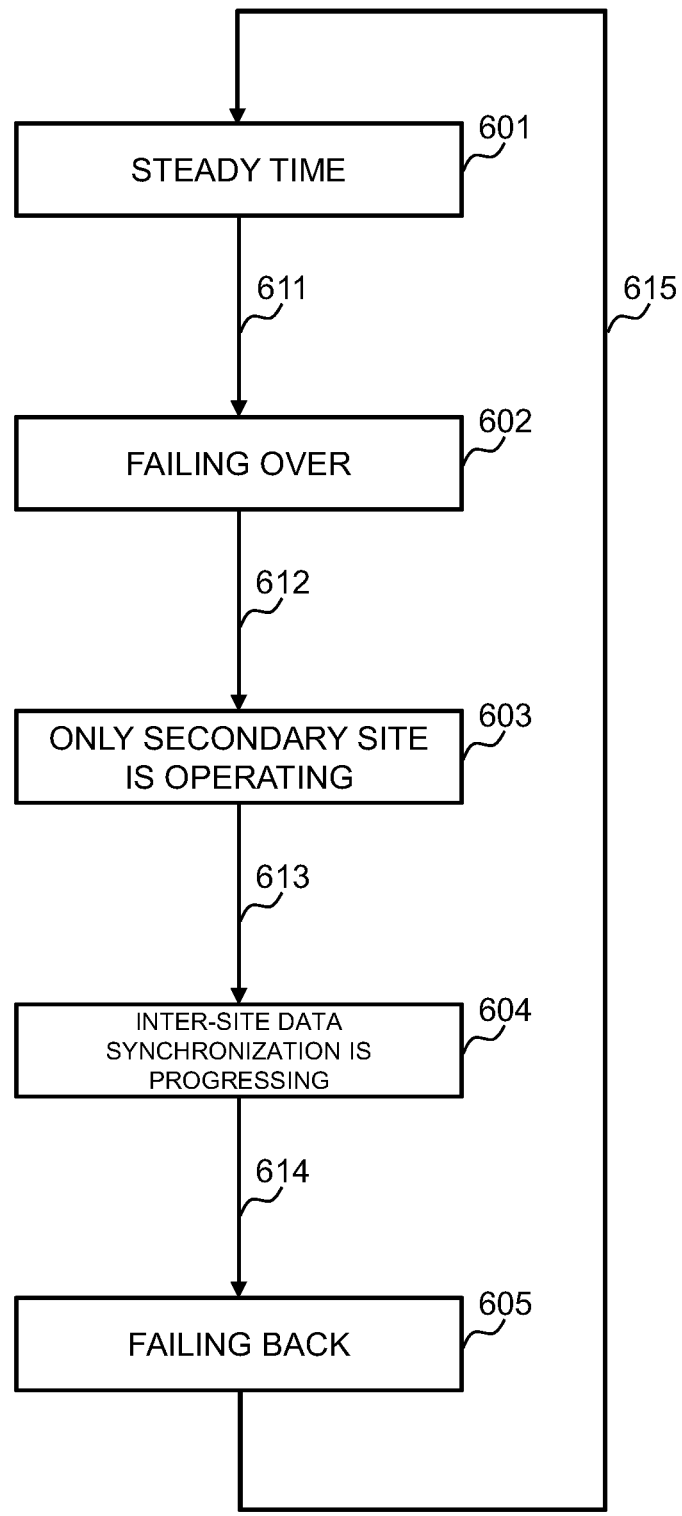
FIG. 8 is a state transition diagram for explaining an example of state transition of the primary site and the secondary site.

FIG. 8 is a state transition diagram for explaining an example of state transition of the primary site 100 and the secondary site 200 according to the present embodiment. The primary site 100 and the secondary site 200 have five states, including a steady-time state 601, a failing-over state 602, a state 603 in which only the secondary site 200 is operating, a state 604 in which inter-site data synchronization is progressing, and a failing-back state 605.

Immediately after introduction of the primary site 100 and the secondary site 200, each of the primary site 100 and the secondary site 200 is initially in the steady-time state 601. When the primary site 100 in the steady-time state 601 has gone down, the state of each of the primary site 100 and the secondary site 200 transitions to the failing-over state 602. The primary site 100 goes down, for example, when a failure has occurred in the primary site 100, or when the primary site 100 is suspended for maintenance purposes.

When each of the primary site 100 and the secondary site 200 is in the failing-over state 602, the failover switching process is performed as a process for making a switch from the primary site 100 to the secondary site 200. Once the failover switching process is completed, the state of each of the primary site 100 and the secondary site 200 transitions to the state 603 in which only the secondary site 200 is operating. In the state 603 in which only the secondary site 200 is operating, only the secondary site 200 performs the aforementioned data processing while the data processing is suspended in the primary site 100. In the secondary site 200 after the failover, data input/output is performed using the secondary volume to which data was transferred from the primary volume in the primary site 100 via remote copy before the failover. Note that specific details of the failover switching process will be described below with reference to FIGS. 11 and 12.

When recovery of the primary site 100 is thereafter completed, the state of each of the primary site 100 and the secondary site 200 transitions to the state 604 in which inter-site data synchronization is progressing. In the state 604 in which inter-site data synchronization is progressing, a data synchronization process of incorporating the content of an updating process performed on the secondary volume 511 in the secondary site 200 while the primary site 100 is down, into the primary volume 510 placed in the primary site 100 through data synchronization via remote copy is performed to cause the content of the primary volume 510 to coincide with the content of the secondary volume 511.

Once the data synchronization process is completed, the state of each of the primary site 100 and the secondary site 200 transitions to the failing-back state 605. In the failing-back state 605, the failback switching process is performed as a process for making a switch from the secondary site 200 to the primary site 100. Once the failback switching process is completed, the state of each of the primary site 100 and the secondary site 200 transitions to the steady-time state 601. During the failback, a process of incorporating data that has been written only to the secondary volume in the secondary site 200 while the failover was performed because the primary site 100 was unable to operate due to a failure, into the primary volume in the primary site 100 is performed. Specific details of the failback switching process will be described below with reference to FIGS. 13 to 15.

Figure 9:
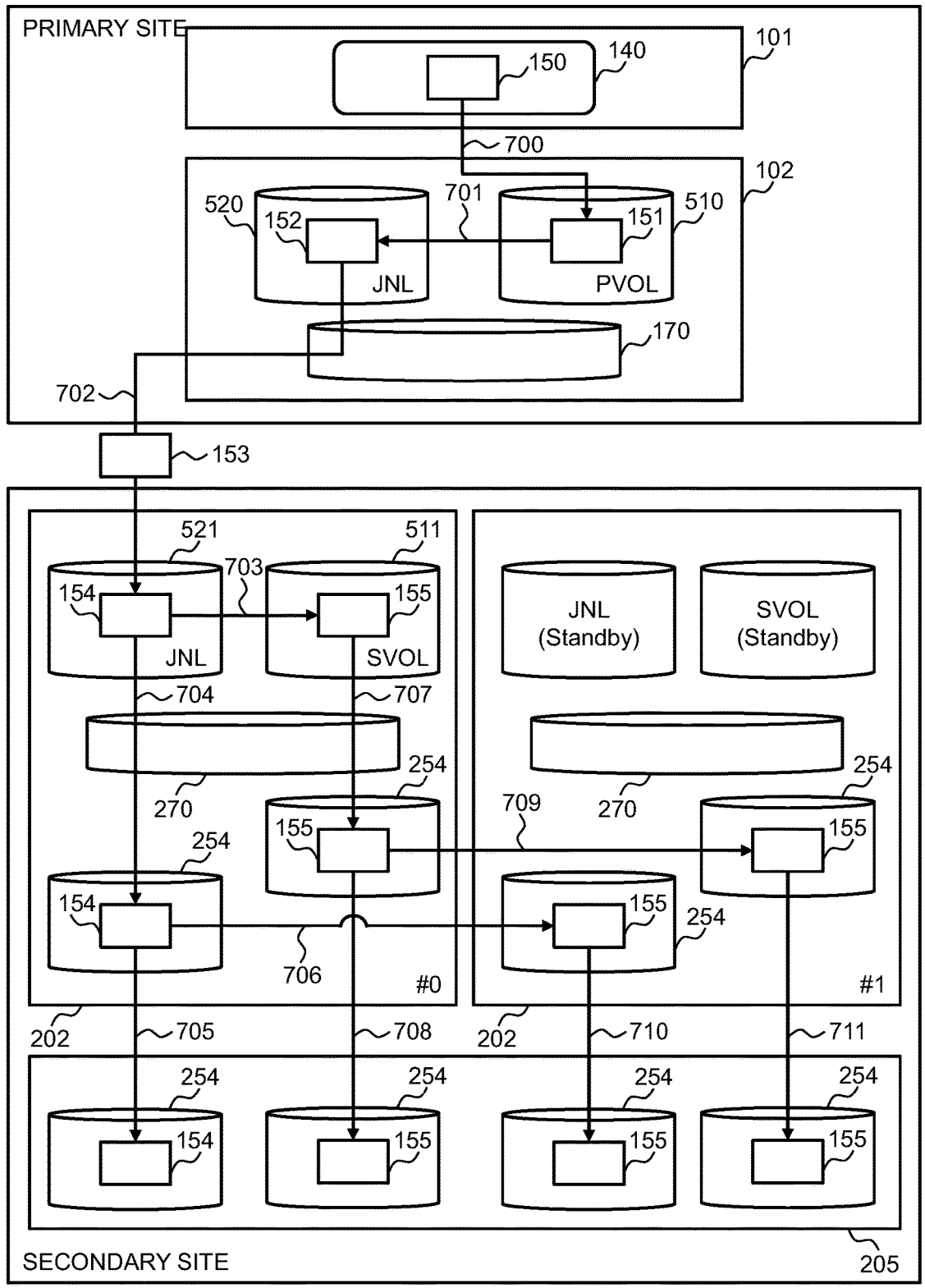
FIG. 9 is a diagram for explaining examples of I/O processing performed at a steady time by a host in the primary site.

FIG. 9 is a diagram for explaining examples of I/O processing performed at a steady time by the host 101 in the primary site 100 according to the present embodiment. In a case where the host 101 in the primary site 100 performs a data write process as I/O processing at a steady time, a program 140 running on the host 101 transmits a write request to the storage system 102 to perform writing of operation target data (arrow 700). A volume ID, an address, a data size, and update data, for example, are included in this write request.

Receiving the write request, the storage system 102 records data 151 including the update data and management information therefor in a target primary volume 510 on the basis of the received write request (arrow 701). Next, the storage system 102 writes the data 151 recorded in the primary volume 510 into the journal volume 520 as updating operation data 152 for the primary volume 510. Thereafter, the storage system 102 transmits, as updating operation data 153, the updating operation data 152 to a storage node 202 labelled #0 and having a secondary volume 511 in the secondary site 200. Note that the primary volume 510 and the journal volume 520 are managed on a storage pool 170 of the storage system 102. The storage pool 170 protects the data through redundancy implemented across a plurality of storage devices installed in the storage system 102. At this time, a redundant array of independent disks (RAID), for example, can be used to implement data protection involving a virtualized protected area.

The storage node 202 labelled #0 receives the updating operation data 153 transmitted as described above, records the updating operation data 153 in a journal volume 521 as updating operation data 154, and incorporates the recorded updating operation data 154 into the secondary volume 511 as updating operation data 155. The journal volume 521 and the secondary volume 511 are managed through a storage pool 270 of the storage node 202 labelled #0. The storage pool 270 protects these pieces of data 154 and 155 through redundancy implemented across multiple storage devices 254 used for storing user data. Mirroring or erasure coding, for example, can be used to implement the data protection. The secondary volumes 511 and the journal volumes 521 form a redundancy group between two or more different storage nodes, and the secondary volume on one of these storage nodes is managed as an active volume while the secondary volume on the other storage node(s) is managed as a standby volume.

In the present embodiment, the storage node 202 labelled #0 is assumed to be an active node while a storage node 202 labelled #1 is assumed to be a standby node. The updating operation data 154 recorded in the journal volume 521 is recorded as data with management information added thereto. Further, another standby node belonging to the redundancy group is requested to perform data update. The storage node 202 labelled #1, which is assumed to be a standby node, performs writing of the updating operation data 155. The storage node 202 labelled #1 records the updating operation data 155 while achieving redundancy among the redundancy group.

Next, a data read process will be described below. In a case where the host 101 in the primary site 100 performs a data read process as I/O processing at a steady time, the program 140 running on the host 101 transmits a read request to read operation target data to the storage system 102. The storage system 102 transmits the data in the primary volume 510 specified by the read request to the host 101.

Figure 10:
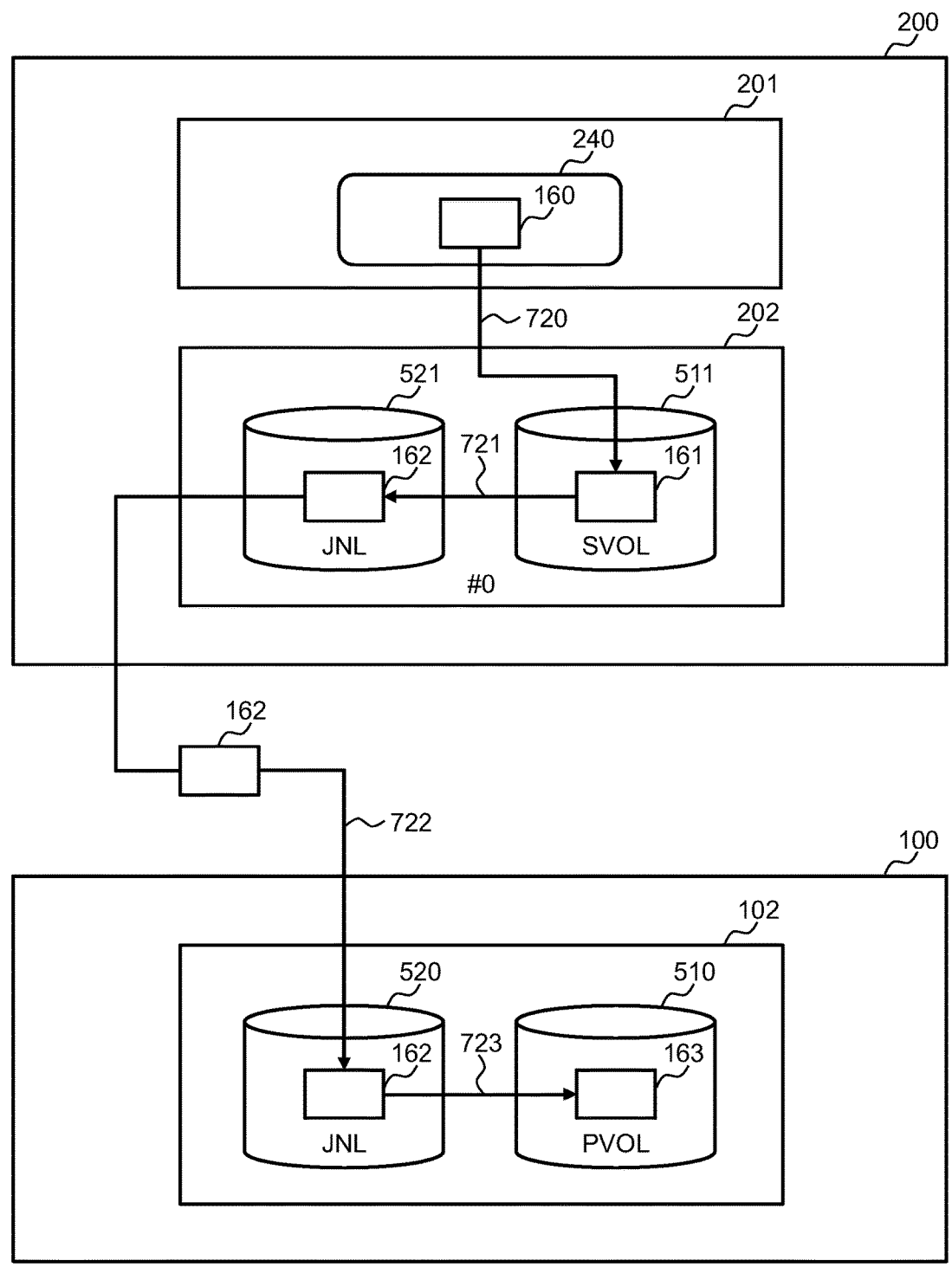
FIG. 10 is a diagram for explaining examples of I/O processing performed between the primary site and the secondary site.

FIG. 10 is a diagram for explaining examples of I/O processing performed between the primary site 100 and the secondary site 200 according to the present embodiment. When I/O processing (e.g., a data write process) is performed in the state 604 in which inter-site data synchronization is progressing, an application 240 running on the host 201 transmits a write request concerning operation target data to the storage node 202 labelled #0 (arrow 720). A volume ID, an address, a data size, and update data 160, for example, are included in the write request.

Receiving the write request from the host 201, the storage node 202 labelled #0 records data 161 including the update data 160 and management information therefor in a secondary volume 511 specified by the write request on the basis of the received write request. Next, the storage node 202 labelled #0 writes updating operation data 162 for the secondary volume 511 into the journal volume 521 of the storage node 202 (arrow 721). Next, the storage node 202 labelled #0 transmits the updating operation data 162 to the storage system 102 having the primary volume 510 in the primary site 100 (arrow 722). Here, a process for implementing redundancy across multiple storage nodes may be performed in a manner similar to the manner adopted in the I/O processing at a steady time.

Receiving the updating operation data 162 from the storage node 202 labelled #0, the storage system 102 records the received updating operation data 162 in the journal volume 520 and incorporates the updating operation data 162 into the primary volume 510 as updating operation data 163 on the basis of an updating operation (arrow 723).

Meanwhile, when I/O processing (e.g., a data write process) is performed in the state 603 in which only the secondary site 200 is operating, upon receipt of a write request from the host 201, the storage node 202 labelled #0 records the data 161 including the update data 160 and the management information therefor in the secondary volume 511 specified by the write request on the basis of the received write request, and writes the updating operation data 162 for the secondary volume 511 into the journal volume 521 of the storage node 202 (arrow 721). At a time when the writing of the updating operation data 162 into the journal volume 521 is thereafter completed, the storage node 202 labelled #0 sends a response regarding a result of the data write process to the host 201 while subsequent processes on the primary site 100 are skipped. Thereafter, when the state of each of the primary site 100 and the secondary site 200 has transitioned to the state 604 in which inter-site data synchronization is progressing, the storage node 202 labelled #0 transmits the updating operation data 162, which was recorded in the journal volume 521 in the state 603 in which only the secondary site 200 is operating, to the primary site 100. The updating operation data 162, transmitted to the primary site 100, is incorporated into the primary volume 510 through the journal volume 520 of the primary site 100 in the primary site 100.

Next, when I/O processing (e.g., a data read process) is performed in the state 604 in which inter-site data synchronization is progressing, the application 240 running on the host 201 transmits a read request to read operation target data to the storage node 202 labelled #0 (arrow 720).

Receiving the read request from the host 201, the storage node 202 labelled #0 transmits, to the host 201, the data 161 in the secondary volume 511 specified by the received read request. Note that a data read process performed in the state 603 in which only the secondary site 200 is operating is similar to the data read process performed in the state 604 in which inter-site data synchronization is progressing.

Figure 11:
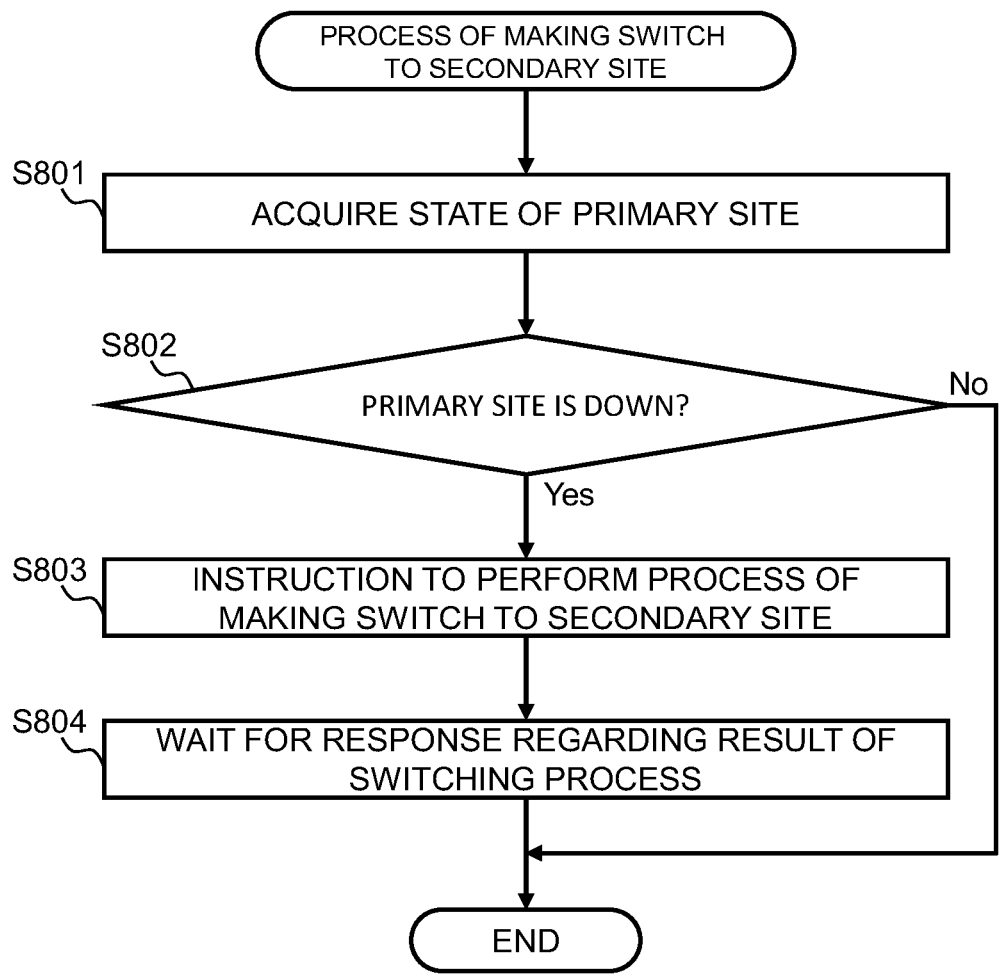
FIG. 11 is a flowchart for explaining monitoring of the state of the primary site and an instruction to perform a process of making a switch to the secondary site in the disaster recovery management site.

FIG. 11 is a flowchart for explaining monitoring of the state of the primary site and an instruction to perform a process of making a switch to the secondary site in the disaster recovery management site according to the present embodiment. The disaster recovery management system 301 of the disaster recovery management site 300 acquires the state of the primary site 100 through the external network 400 (step S801).

In the present embodiment, the disaster recovery management system 301 of the disaster recovery management site 300 and the site management system 103 of the primary site 100 perform network communication therebetween through the external network (WAN) 400, and the disaster recovery management system 301 periodically acquires the state of the primary site 100 from the site management system 103 of the primary site 100. Alternatively, the site management system 103 of the primary site 100 may regularly transmit the state of the primary site 100 to the disaster recovery management system 301 of the disaster recovery management site 300.

The disaster recovery management system 301 of the disaster recovery management site 300 checks the information as to the primary site 100 acquired from the primary site 100 and determines whether the primary site 100 is down (step S802). In a case where the primary site 100 is not down at step S802, i.e., in a case where the primary site 100 is normally operating, the disaster recovery management system 301 finishes a process in this routine. Meanwhile, in a case where the primary site 100 is down at step S802, i.e., in a case where a failure has occurred in the primary site 100, the disaster recovery management system 301 instructs the site management system 203 of the secondary site 200 to perform a process of making a switch to the secondary site 200 (step S803).

Thereafter, the disaster recovery management system 301 waits for a response regarding a result of the switching process from the site management system 203 of the secondary site 200 (step S804), and after receiving the response regarding the result, the disaster recovery management system 301 initiates the state in which, out of the primary site 100 and the secondary site 200, only the secondary site 200 is operating, and finishes the process in this routine. Thereafter, the disaster recovery management system 301 waits for a restart of the primary site 100, and when the primary site 100 has restarted, the disaster recovery management system 301 starts inter-site data synchronization between the primary site 100 and the secondary site 200.

Figure 12:
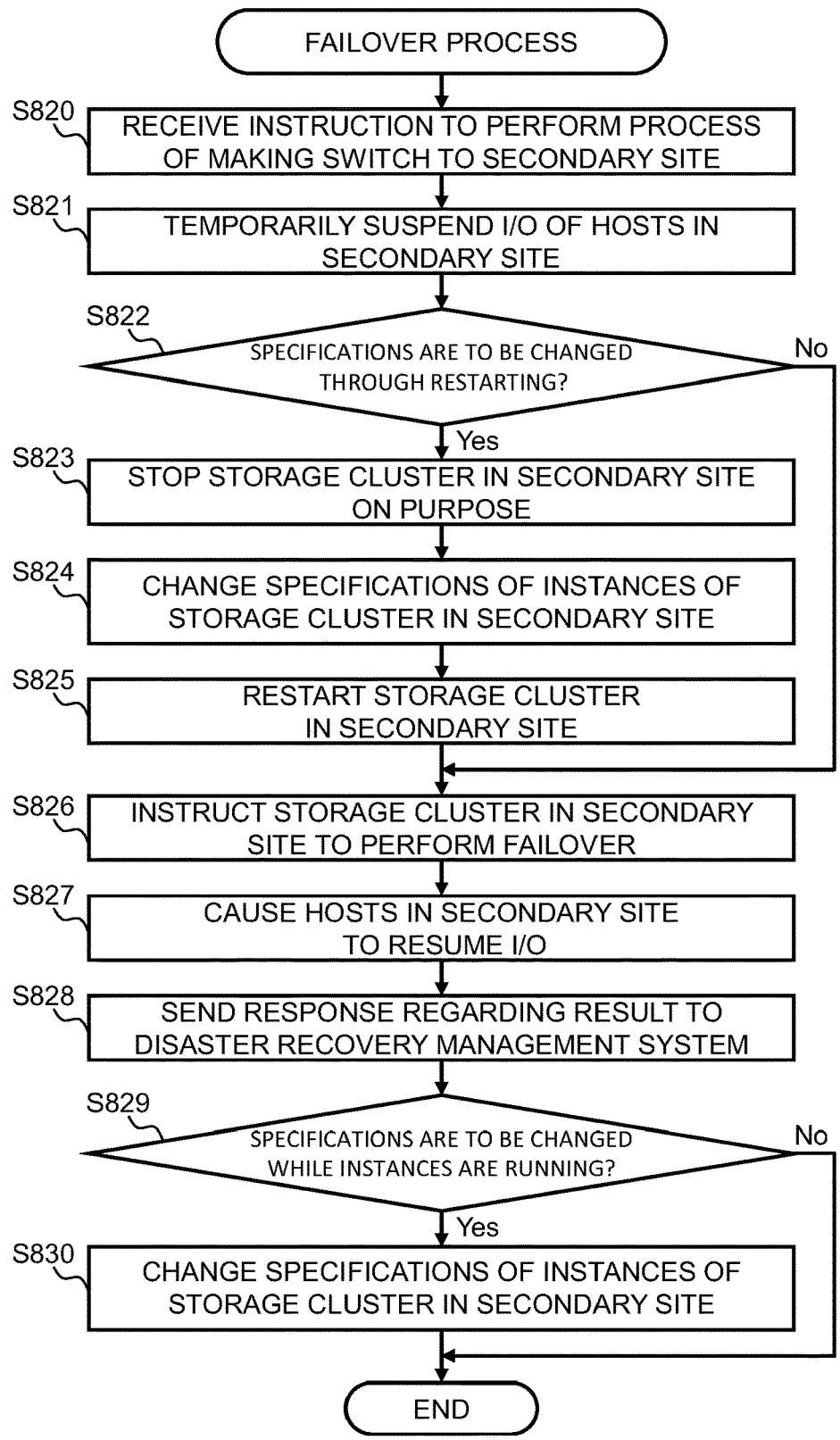
FIG. 12 is a flowchart for explaining a failover switching process performed in the secondary site.

FIG. 12 is a flowchart for explaining the failover switching process performed in the secondary site according to the present embodiment. The site management system 203 of the secondary site 200 starts the failover switching process on the condition that the instruction to perform the process of making a switch to the secondary site 200 has been received from the disaster recovery management system 301 of the disaster recovery management site 300 (step S820).

The site management system 203 of the secondary site 200 instructs all the hosts 201 in the secondary site 200 to temporarily suspend any I/O processing, thereby causing all the hosts 201 to temporarily suspend any I/O processing (step S821).

In a case where the site management system 203 is configured to change the specifications of instances through restarting, the site management system 203 instructs a storage cluster in the secondary site 200 to stop, thereby stopping the storage cluster (step S823). The site management system 203, which is an example of a specifications determination section, for example, collects load information as to at least the secondary site 200 at a steady time, and determines the instance specifications such that the secondary site 200 is able to handle a peak load on the basis of the collected load information. The instance specifications include amounts of hardware resources used by the instances. Here, the amounts of hardware resources include, for example, a resource amount(s) of at least one of an arithmetic processing device (e.g., a CPU), a main storage device (e.g., a memory), and a network (e.g., a network interface card).

Thereafter, the site management system 203 determines whether the specifications are to be changed through restarting (step S822). At this time, the site management system 203 checks the setting of a method for changing the instance specifications, and in a case where the method of changing the instance specifications through restarting has been set, the site management system 203 proceeds to step S823, whereas, in a case where the method of changing the specifications while the instances are running has been set, the site management system 203 proceeds to step S826.

Next, the site management system 203 acquires, from the aforementioned instance specifications information management table 332, the specifications with which the I/O processing is being performed in the secondary site 200, and changes the specifications of all instances of the storage cluster on the basis of the acquired specifications (step S824). When changing the specifications of the instances, the site management system 203 of the secondary site 200, for example, uses an instance management application programming interface (API) provided by a cloud, for example, to request the cloud to change the specifications.

Next, the site management system 203 of the secondary site 200 restarts the storage cluster (step S825) and waits for completion of the restart of the storage cluster. When restarting the storage cluster, the site management system 203 of the secondary site 200, for example, uses the instance management API provided by the cloud to request the cloud to turn on all the instances of the storage cluster. After all the instances of the storage cluster are started, the storage cluster is restarted by the process of restarting the storage cluster.

Next, after the restart of the storage cluster is completed, the site management system 203 of the secondary site 200 instructs the storage cluster to perform the failover switching process (step S826).

Next, the site management system 203 of the secondary site 200 instructs all the hosts 201 in the secondary site 200 to resume the I/O processing, thereby causing all the hosts 201 to resume the I/O processing (step S827), and thereafter sends a response regarding a result to the disaster recovery management system 301 (step S828).

Next, the site management system 203 of the secondary site 200 determines whether the specifications are to be changed while the instances are running (step S829). In a case where the specifications are not to be changed while the instances are running, the site management system 203 finishes the process in this routine, whereas, in a case where the specifications are to be changed while the instances are running, the site management system 203 proceeds to step S830. That is, in a case where it has been found that the specifications are to be changed while the instances are running when the setting of the method for changing the specifications of the instances has been checked at step S822, the site management system 203 of the secondary site 200 changes the specifications of the instances of the storage cluster in the secondary site 200 (step S830) after sending a response regarding a result to the disaster recovery management system 301, and thereafter finishes the process in this routine.

In the computer system according to the present embodiment, which includes the host 101 that performs I/O processing on the primary volume 510, a plurality of instances run in the secondary site 200. In a disaster recovery process, for example, the aforementioned specifications changing function changes the instance specifications of the instances in the secondary site 200 one instance after another while letting the I/O processing continue.

In addition, in the present embodiment, the aforementioned specifications changing function changes the instance specifications of the instances in the secondary site 200 one instance after another while letting the I/O processing continue after the failback switching process is performed.

That is, the specifications of the instances are changed in a sequential manner, one storage node after another, with respect to the storage nodes in the redundancy group formed between a plurality of storage nodes while letting the I/O processing continue. Specifically, in the present embodiment, the storage nodes are stopped one after another, the specifications of the instances of the respective storage nodes are changed, and, further, the storage nodes are restarted one after another. The specifications of the instances are changed in a manner similar to the manner described above. This is performed on all storage nodes in the storage cluster.

Figure 13:
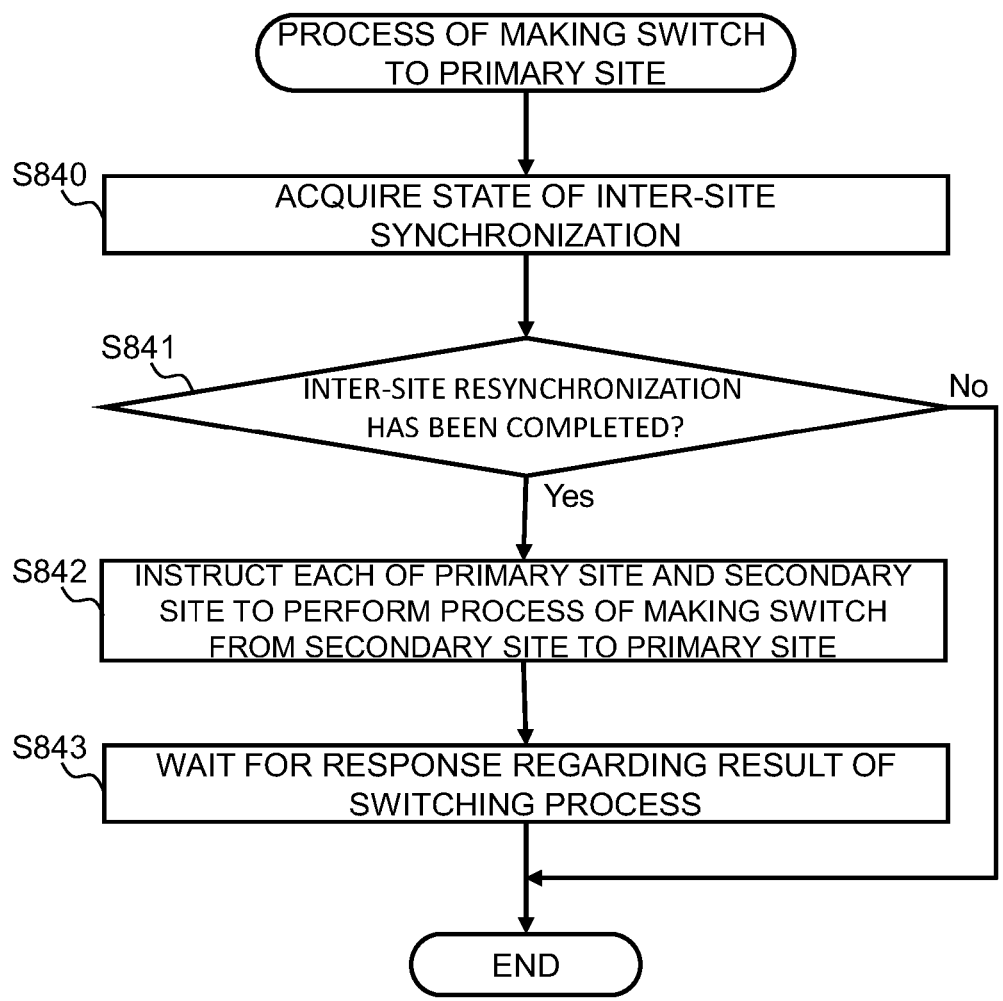
FIG. 13 is a flowchart for explaining the monitoring of the state of each of the primary site and the secondary site and an instruction to perform a process of making a switch to the primary site in the disaster recovery management site.

FIG. 13 is a flowchart for explaining the monitoring of the state of each of the primary site 100 and the secondary site 200 and an instruction to perform a process of making a switch to the primary site 100 in the disaster recovery management site 300 according to the present embodiment. When monitoring the state of each of the primary site 100 and the secondary site 200, the disaster recovery management system 301 of the disaster recovery management site 300 acquires the state of the inter-site data synchronization between the primary site 100 and the secondary site 200 (step S840).

At this time, in the present embodiment, the disaster recovery management system 301 of the disaster recovery management site 300, the site management system 103 of the primary site 100, and the site management system 203 of the secondary site 200 perform network communication therebetween through the external network (WAN) 400, and the disaster recovery management system 301 of the disaster recovery management site 300 periodically acquires the state from each of the site management system 103 of the primary site 100 and the site management system 203 of the secondary site 200. Alternatively, each of the site management system 103 of the primary site 100 and the site management system 203 of the secondary site 200 may regularly transmit the state to the disaster recovery management system 301 of the disaster recovery management site 300.

The disaster recovery management system 301 of the disaster recovery management site 300 checks the acquired state of the inter-site data synchronization to determine whether inter-site data resynchronization therebetween has been completed (step S841). In a case where it is determined at step S841 that the inter-site data resynchronization has not been completed yet, i.e., in a case where the inter-site data synchronization is still in progress, the disaster recovery management system 301 finishes a process in this routine, whereas, in a case where it is determined at step S841 that the inter-site data resynchronization has been completed, i.e., in a case where the inter-site data synchronization has been completed, the disaster recovery management system 301 instructs each of the site management system 103 of the primary site 100 and the site management system 203 of the secondary site 200 to perform a process of making a switch from the secondary site 200 to the primary site 100 (step S842).

Thereafter, the disaster recovery management system 301 of the disaster recovery management site 300 waits for a response regarding a result of the switching process from each of the site management system 103 of the primary site 100 and the site management system 203 of the secondary site 200 (step S843) and finishes the process in this routine after receiving the responses regarding the result.

Figure 14:
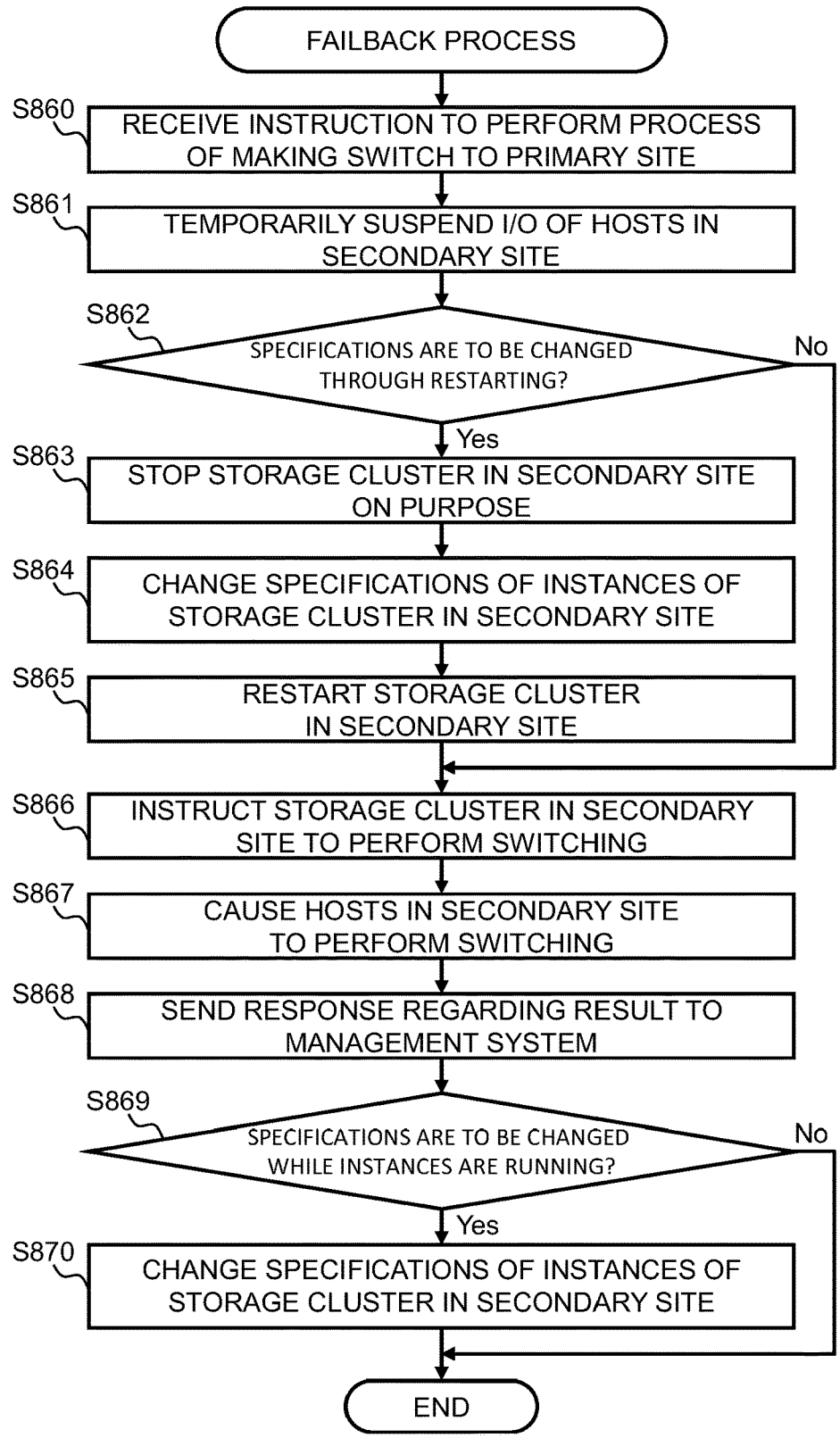
FIG. 14 is a flowchart for explaining a failback switching process performed in the secondary site.

FIG. 14 is a flowchart for explaining the failback switching process performed in the secondary site 200 according to the present embodiment. The site management system 203 of the secondary site 200 starts the failback switching process on the condition that the instruction to perform the process of making a switch to the primary site 100 has been received from the disaster recovery management system 301 of the disaster recovery management site 300 (step S860).

The site management system 203 of the secondary site 200 instructs all the hosts 201 in the secondary site 200 to temporarily suspend any I/O processing, thereby causing all the hosts 201 to temporarily suspend any I/O processing (step S861). Thereafter, the site management system 203 determines whether the specifications are to be changed through restarting (step S862). At this time, the site management system 203 checks the setting of the method for changing the specifications of the instances, and in a case where the method of changing the specifications of the instances through restarting has been set, the site management system 203 proceeds to step S863, whereas, in a case where the method of changing the specifications while the instances are running has been set, the site management system 203 proceeds to step S866.

In a case where the site management system 203 of the secondary site 200 is configured to change the specifications of the instances through restarting, the site management system 203 instructs the storage cluster in the secondary site 200 to stop on purpose, thereby stopping the storage cluster (step S863).

Next, the site management system 203 acquires, from the aforementioned instance specifications information management table 332, the specifications with which the I/O processing is being performed in the secondary site 200, and changes the specifications of all the instances of the storage cluster on the basis of acquired values (step S864). When changing the specifications of the instances, the site management system 203 of the secondary site 200, for example, uses the instance management API provided by the cloud to request the cloud to change the specifications.

Next, the site management system 203 of the secondary site 200 restarts the storage cluster (step S865) and waits for completion of the restart of the storage cluster. When restarting the storage cluster, the site management system 203 of the secondary site 200, for example, uses the instance management API provided by the cloud to request the cloud to turn on all the instances of the storage cluster. After all the instances of the storage cluster are started, the storage cluster is restarted by the process of restarting the storage cluster.

Next, after the restart of the storage cluster is completed, the site management system 203 of the secondary site 200 instructs the storage cluster to perform the failback switching process (step S866).

Next, the site management system 203 of the secondary site 200 instructs all the hosts 201 in the secondary site 200 to resume the I/O processing, thereby causing all the hosts 201 to resume the I/O processing (step S867), and thereafter sends a response regarding a result to the disaster recovery management system 301 (step S868).

Next, the site management system 203 of the secondary site 200 determines whether the specifications are to be changed while the instances are running (step S869). In a case where the specifications are not to be changed while the instances are running, the site management system 203 finishes this failback switching process, whereas, in a case where the specifications are to be changed while the instances are running, the site management system 203 performs step S870. That is, in a case where it has been found that the specifications are to be changed while the instances are running when the setting of the method for changing the specifications of the instances has been checked at step S862, the site management system 203 of the secondary site 200 changes the specifications of the instances of the storage cluster in the secondary site 200 at step S870 after sending a response regarding a result to the disaster recovery management system 301, and thereafter finishes this failback switching process.

As described above, the specifications of the instances are changed in a sequential manner, one storage node after another, with respect to the storage nodes in the redundancy group formed between a plurality of storage nodes while letting remote copy accompanying the I/O processing continue. Each storage node is stopped on purpose, the specifications of the instance of this storage node are changed, and the storage node is restarted. The specifications of the instances are changed in a manner similar to the manner described above. This is performed on all storage nodes in the storage cluster.

Figure 15:
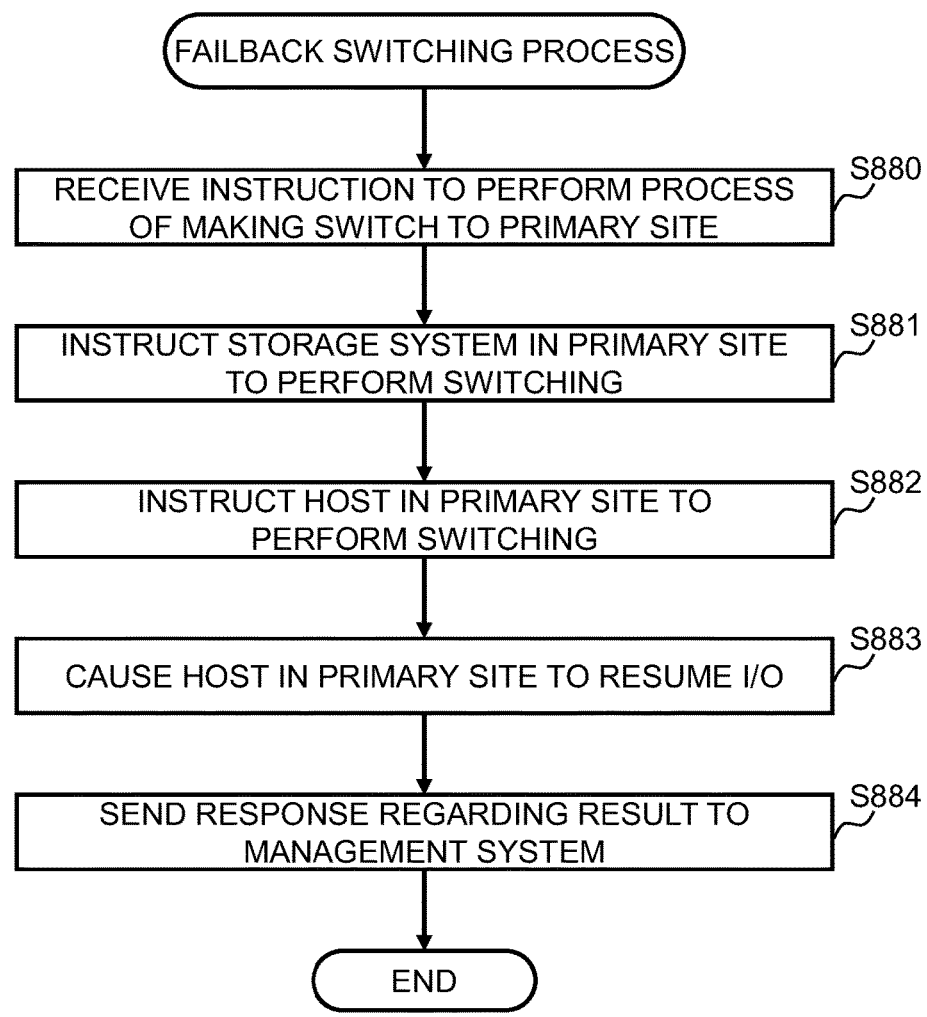
FIG. 15 is a flowchart for explaining a failback switching process performed in the primary site.

FIG. 15 is a flowchart for explaining the failback switching process performed in the primary site according to the present embodiment. The site management system 103 of the primary site 100 starts the failback switching process in the primary site 100 on the condition that the instruction to perform the process of making a switch from the secondary site 200 to the primary site 100 has been received from the disaster recovery management system 301 of the disaster recovery management site 300 (step S880).

The site management system 103 of the primary site 100 instructs the storage system 102 in the primary site 100 to perform the process of making a switch from the secondary site 200 to the primary site 100 and waits for completion of this switching process (step S881).

Next, the site management system 103 of the primary site 100 instructs the host 101 in the primary site 100 to perform a process of making a switch to the host 101 in the primary site 100 and waits for completion of this switching process (step S882).

Next, the site management system 103 of the primary site 100 instructs the host 101 in the primary site 100 to resume the I/O processing, thereby causing the host 101 to resume the I/O processing (step S883). Thereafter, the site management system 103 sends a response regarding a result of the I/O processing to the disaster recovery management system 301 of the disaster recovery management site 300 (step S884), and thereafter finishes this failback switching process.

As described above, the computer system according to the present embodiment includes the primary site 100, which has a primary volume and has an instance that performs data processing related to data inputted to or outputted from the primary site 100; and the secondary site 200, which has a secondary volume 511 paired with the primary volume through data synchronization via remote copy, and which has an instance. Remote copy is set up between the primary volume and the secondary volume, and the instance of the primary site 100 transfers data inputted to or outputted from the primary volume to the secondary site 200, while the instance of the secondary site 200 stores the transferred data in the secondary volume. The computer system has a specifications changing function that changes the specifications of the instance of the secondary site 200 when a failover switching process of switching a performer of the data processing from the primary site 100 to the secondary site 200 is performed, or when a failback switching process of switching the performer of the data processing from the secondary site 200 to the primary site 100 after the failover switching process is performed (a specifications changing step).

The above configuration makes it possible to limit the specifications of the instance of the secondary site 200 at a steady time to a minimum, which contributes to limiting a cost involved in the operation of the secondary site 200 at a steady time. This makes it possible to limit a cost involved in the hardware of the secondary site 200 at a steady time while maintaining the performance of I/O processing in a disaster recovery process.

In the computer system according to the present embodiment, when a failure has occurred in the primary site 100 and the failover switching process is performed to make a switch from the primary site 100 to the secondary site 200, the specifications changing function raises the specifications of the instance that performs the data processing in the secondary site 200. This makes it possible to ensure sufficient operation specifications of the instance in the secondary site 200 in the disaster recovery process, enabling the instance to exhibit higher performance than at a steady time.

In the computer system according to the present embodiment, when the failover switching process has been performed, the instance of the secondary site 200 processes input/output data, and inputs or outputs the input/output data to or from the secondary volume.

In the computer system according to the present embodiment, when the failover switching process has been performed, the instance of the secondary site 200 performs data input/output using the secondary volume having data synchronized with that of the primary volume via the remote copy prior to the failover switching process.

In the computer system according to the present embodiment, the remote copy is stopped when the failover switching process has been performed.

In the computer system according to the present embodiment, when the primary site 100 has been recovered from the failure and the failback switching process is performed to switch the performer of the processing, switched from the primary site 100 to the secondary site 200 by the failover switching process, from the secondary site 200 to the primary site 100, the specifications of the instance in the secondary site 200 are lowered. This makes it possible to reduce the instance specifications of the secondary site 200 to a minimum that is required of the secondary site 200 at a steady time after the failback switching process is performed, which contributes to reducing the cost and power consumption of the secondary site 200.

In the computer system according to the present embodiment, the specifications include an amount or amounts of hardware resources used by the instance. This makes it possible to minimize an operational cost of the hardware of the secondary site 200 at a steady time, and also to reduce the power consumption.

In the computer system according to the present embodiment, the amount or amounts of hardware resources include a resource amount of at least one of an arithmetic processing device, a memory, and a network. This makes it possible to minimize the operational cost of the hardware of the secondary site 200 at a steady time, and also to reduce the power consumption.

In the present embodiment, when the failover switching process or the failback switching process is performed, the specifications changing function stops and restarts the secondary site 200 and changes the specifications of the instance that performs the data processing when restarting the secondary site 200. This makes it possible to reduce the likelihood that data inconsistency between the primary volume in the primary site 100 and the secondary volume in the secondary site 200 will occur.

In the computer system according to the present embodiment, a plurality of instances run in the secondary site 200, and the specifications changing function changes the specifications of the plurality of instances in the secondary site 200 one instance after another while letting the I/O processing continue in the disaster recovery process. This makes it possible to securely change the specifications of each instance while limiting an effect thereof on the I/O processing in the disaster recovery process.

In the computer system according to the present embodiment, which includes the host 101 that performs I/O processing on the primary volume, a plurality of instances run in the secondary site 200, and the specifications changing function changes the operation specifications of the instances in the secondary site 200 one instance after another while letting the I/O processing continue after the failback switching process is performed. This makes it possible to securely change the specifications of each instance while limiting an effect thereof on the I/O processing after the failback switching process is performed.

In the present embodiment, the secondary site 200 includes the site management system 203, and the site management system 203 collects the load information as to at least the primary site 100 at a steady time and determines the specifications of the instance such that the primary site 100 is able to handle a peak load on the basis of the collected load information. This contributes to ensuring that the secondary site 200 will have at least minimum instance specifications that are capable of handling the peak load without having superfluous instance specifications, and to minimizing the operational cost and also reducing the power consumption.

Note that the present invention is not limited to the embodiment described above, but encompasses a variety of modifications and equivalents thereof that fall within the spirit and scope of the appended claims. For example, the embodiment described above has been described in detail to clearly describe the present invention, and the present invention is not limited to an embodiment that has all the features described above.

Also note that the features, functions, etc., described above may be partially or entirely implemented in hardware through, for example, designing of an integrated circuit, or may be partially or entirely implemented in software through a processor interpreting and executing programs for implementing the functions.

Respective pieces of information such as the programs, tables, files, etc., for implementing the functions may be stored in a storage device such as a memory, a hard disk, or an SSD, or a storage medium such as an integrated circuit (IC) card, a secure digital (SD) card, or a digital versatile disc (DVD).

The embodiment of the present invention is applicable to computer systems that involve a method for reducing the cost and power consumption of a secondary site by reducing hardware usage therein when the secondary site is on standby.

What is claimed is:

1. A computer system for improving disaster-recovery operation of a remote-copy storage cluster by preserving write-order consistency, the computer system comprising:
    a primary site having a primary volume, and having an instance that performs data processing related to input/output data for the primary volume;
    a secondary site having a secondary volume, and having an instance; and
    a disaster-recovery controller including a state transition manager and a specifications changing section,
    wherein remote copy with write-order preservation using a journal is set up between the primary volume and the secondary volume, and the instance of the primary site transfers, in write order, data inputted to or outputted from the primary volume to the secondary site while the instance of the secondary site stores transferred data and associated journal entries in the secondary volume,
    wherein, responsive to the state transition manager detecting a transition in a disaster-recovery state machine to a failover state that switches a performer of the data processing from the primary site to the secondary site, or to a failback state that switches the performer from the secondary site to the primary site after the failover, the specifications changing section programmatically invokes provider-specific instance-management interfaces to change at least one hardware resource allocation of the instance of the secondary site in coordination with (i) stopping or resuming remote copy as appropriate to the transition and (ii) promotion or demotion of the primary and secondary volumes,
    wherein, when a failover switching process or a failback switching process is performed, the secondary site is stopped and restarted, and
    the specifications of the instance that performs the data processing are changed when the secondary site is restarted, or are changed sequentially on a node-by-node basis while client I/O is maintained by temporarily redirecting I/O to peer nodes.

2. The computer system according to claim 1,
    wherein, when a failure has occurred in the primary site and the failover switching process is performed to make a switch from the primary site to the secondary site, the specifications of the instance that performs the data processing in the secondary site are raised before the secondary volume is exposed for host I/O.

3. The computer system according to claim 2,
wherein, when the failover switching process has been performed, the instance of the secondary site processes input/output data, and inputs or outputs the input/output data to or from the secondary volume while maintaining write-order consistency established by the journal.

4. The computer system according to claim 2,
wherein, when the failover switching process has been performed, the instance of the secondary site performs data input/output using the secondary volume having data synchronized with that of the primary volume via the remote copy prior to the failover switching process, including committing the journal to establish a consistency point prior to host I/O.

5. The computer system according to claim 2,
wherein the remote copy is stopped when the failover switching process has been performed, and a resynchronization using the journal is performed prior to the failback switching process.

6. The computer system of claim 5,
wherein the resynchronization comprises transferring, from the primary site to the secondary site, writes accumulated during secondary-only operation with preservation of write-order using the journal.

7. The computer system according to claim 2,
wherein, when the primary site has been recovered from the failure and the failback switching process is performed to switch the performer of the processing, switched from the primary site to the secondary site by the failover switching process, from the secondary site to the primary site, the specifications of the instance in the secondary site are lowered after the primary site resumes host I/O and remote copy to the secondary site is re-established.

8. The computer system according to claim 1,
wherein the specifications include an amount or amounts of hardware resources used by the instance comprising at least one of instance class, virtual CPU count, memory size, and network bandwidth.

9. The computer system according to claim 8,
wherein the amount or amounts of hardware resources include a resource amount of at least one of an arithmetic processing device, a memory, and a network.

10. The computer system according to claim 1,
wherein the secondary site includes a specifications determination section that records, during a steady state, maxima of CPU utilization, memory usage, and network throughput observed at least for the primary site in a site-performance table, consults an instance-specifications table describing available instance types and their resource capacities, and selects a lowest-cost instance type as the specifications of the instance of the secondary site that meets or exceeds a peak load observed at the primary site on a basis of the recorded maxima.

11. The computer system of claim 1,
wherein the provider-specific instance-management interfaces comprise cloud APIs that change an instance class, a number of virtual CPUs, a memory size, or a network bandwidth allocation for a virtual server executing the instance.

12. The computer system of claim 1,
wherein the state transition manager models disaster-recovery states including steady, failing-over, secondary-only, resynchronization, and failing-back, and the specifications changing section performs the change only upon entry into the failing-over or failing-back states.

13. An operation management method to be employed in a computer system including:
a primary site having a primary volume, and having an instance that performs data processing related to input/output data; and
a secondary site having a secondary volume, and having an instance,
wherein remote copy with write-order preservation using a journal is set up between the primary volume and the secondary volume, and the instance of the primary site transfers, in write order, data inputted to or outputted from the primary volume to the secondary site while the instance of the secondary site stores transferred data and associated journal entries in the secondary volume,
wherein, when a failover switching process or a failback switching process is performed, the secondary site is stopped and restarted,
wherein a specifications of the instance that performs the data processing are changed when the secondary site is restarted, or are changed sequentially on a node-by-node basis while client I/O is maintained by temporarily redirecting I/O to peer nodes, and
wherein the method comprises detecting, by a state transition manager, a transition to a failover state or a failback state and, responsive thereto, programmatically invoking provider-specific instance-management interfaces to change at least one hardware resource allocation of the instance of the secondary site in coordination with (i) stopping or resuming remote copy as appropriate to the transition and (ii) promotion or demotion of the primary and secondary volumes.

14. The operation management method of claim 13, further comprising recording, during a steady state, maxima of CPU utilization, memory usage, and network throughput observed at least for the primary site, selecting a lowest-cost instance type for the secondary site that meets or exceeds a peak of a recorded maxima, and effecting the specification change by invoking cloud APIs upon the detected transition.

15. A computer system for improving disaster-recovery operation of a remote-copy storage cluster by preserving write-order consistency, the computer system comprising:
a primary site having a primary volume, and having an instance that performs data processing related to input/output data for the primary volume;
a secondary site having a secondary volume, and having an instance; and
a disaster-recovery controller including a state transition manager and a specifications changing section,
wherein remote copy with write-order preservation using a journal is set up between the primary volume and the secondary volume, and the instance of the primary site transfers, in write order, data inputted to or outputted from the primary volume to the secondary site while the instance of the secondary site stores transferred data and associated journal entries in the secondary volume,
wherein, responsive to the state transition manager detecting a transition in a disaster-recovery state machine to a failover state that switches a performer of the data processing from the primary site to the secondary site, or to a failback state that switches the performer from the secondary site to the primary site after the failover, the specifications changing section programmatically invokes provider-specific instance-management interfaces to change at least one hardware resource allocation of the instance of the secondary site in coordination with (i) stopping or resuming remote copy as appropriate to the transition and (ii) promotion or demotion of the primary and secondary volumes, and wherein the secondary site includes a specifications determination section that records, during a steady state, maxima of CPU utilization, memory usage, and network throughput observed at least for the primary site in a site-performance table, consults an instance-specifications table describing available instance types and their resource capacities, and selects a lowest-cost instance type as the specifications of the instance of the secondary site that meets or exceeds a peak load observed at the primary site based on a recorded maxima.

16. The computer system according to claim 15, wherein, when the failover switching process or the failback switching process is performed, the secondary site is stopped and restarted, and the specifications of the instance that performs the data processing are changed when the secondary site is restarted, or are changed sequentially on a node-by-node basis while client I/O is maintained by temporarily redirecting I/O to peer nodes.

17. The computer system of claim 16, wherein sequential node-by-node specification changes are executed by (i) quiescing a first node, (ii) applying the specification change to the first node, (iii) re-admitting the first node to service, and (iv) repeating for remaining nodes while client I/O is served by non-quiesced nodes.

\* \* \* \* \*